United States Patent
Amin et al.

(10) Patent No.: US 10,556,825 B2
(45) Date of Patent: *Feb. 11, 2020

(54) STRENGTHENED GLASS WITH DEEP DEPTH OF COMPRESSION

(71) Applicant: CORNING INCORPORATED, Corning, NY (US)

(72) Inventors: Jaymin Amin, Corning, NY (US); Benedict Osobomen Egboiyi, Painted Post, NY (US); Pascale Oram, Hammondsport, NY (US); Jonathan David Pesansky, Corning, NY (US); Kevin Barry Reiman, Horseheads, NY (US); Rostislav Vatchev Roussev, Painted Post, NY (US); Vitor Marino Schneider, Painted Post, NY (US); Brian Paul Strines, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 431 days.

This patent is subject to a terminal disclaimer.

(21) Appl. No.: 15/416,205

(22) Filed: Jan. 26, 2017

(65) Prior Publication Data

US 2017/0129803 A1 May 11, 2017

Related U.S. Application Data

(63) Continuation of application No. 14/723,815, filed on May 28, 2015, now Pat. No. 9,567,254, which is a
(Continued)

(51) Int. Cl.
*C03C 21/00* (2006.01)
*C03C 3/097* (2006.01)
(Continued)

(52) U.S. Cl.
CPC ............ *C03C 21/002* (2013.01); *C03C 3/04* (2013.01); *C03C 3/085* (2013.01); *C03C 3/087* (2013.01);
(Continued)

(58) Field of Classification Search
None
See application file for complete search history.

(56) References Cited

U.S. PATENT DOCUMENTS 3,433,611 A 3/1969 Saunders et al.
3,798,013 A 3/1974 Inoue et al.
(Continued)

FOREIGN PATENT DOCUMENTS

CN 102690059 9/2012
CN 102815860 A 12/2012
(Continued)

OTHER PUBLICATIONS

Aegerter et al; "Sol-gel technologies for glass producers and users—Chapter 4.1.8—Scratch resistant coatings (G. Helsch and G. H. Frischat)", pp. 217-221, Kluwer Academic Publishers, 2004.
(Continued)

*Primary Examiner* — David Sample
(74) *Attorney, Agent, or Firm* — Jeffrey A. Schmidt

(57) ABSTRACT

Chemically strengthened glass articles having at least one deep compressive layer extending from a surface of the article to a depth of layer DOL of about 130 μm up to about 175 μm or, alternatively, to a depth of compression (DOC) in a range from about 90 μm to about 120 μm within the article. The compressive layer has a stress profile that includes a first substantially linear portion extending from a relatively shallow depth to the DOL or DOC and a second portion extending from the surface to the shallow depth. The second portion is substantially linear at a depth from 0 μm
(Continued)

to 5 μm and has a steeper slope than that of the first portion of the profile. Methods of achieving such stress profiles are also described.

26 Claims, 9 Drawing Sheets

Related U.S. Application Data continuation-in-part of application No. 14/530,073, filed on Oct. 31, 2014, now Pat. No. 10,118,858.

(60) Provisional application No. 61/943,758, filed on Feb. 24, 2014, provisional application No. 62/014,464, filed on Jun. 19, 2014, provisional application No. 62/014,372, filed on Jun. 19, 2014, provisional application No. 62/029,075, filed on Jul. 25, 2014.

(51) Int. Cl.
    *C03C 3/087* (2006.01)
    *C03C 3/091* (2006.01)
    *C03C 3/093* (2006.01)
    *C03C 3/095* (2006.01)
    *C03C 4/18* (2006.01)
    *C03C 3/04* (2006.01)
    *C03C 3/085* (2006.01)
    *G06F 1/16* (2006.01)
    *H04B 1/3827* (2015.01)

(52) U.S. Cl.
    CPC .............. *C03C 3/091* (2013.01); *C03C 3/093* (2013.01); *C03C 3/095* (2013.01); *C03C 3/097* (2013.01); *C03C 4/18* (2013.01); *C03C 21/00* (2013.01); *G06F 1/1637* (2013.01); *C03C 2204/00* (2013.01); *G06F 2200/1634* (2013.01); *H04B 1/3827* (2013.01); *Y10T 428/315* (2015.01)

(56) References Cited

U.S. PATENT DOCUMENTS

| | | | |
|---|---|---|---|
| 3,936,287 A | 2/1976 | Beall et al. | |
| 4,042,405 A | 8/1977 | Krohn et al. | |
| 4,726,981 A | 2/1988 | Pierson et al. | |
| 5,350,607 A | 9/1994 | Tyson et al. | |
| 5,773,148 A | 6/1998 | Charrue et al. | |
| 5,895,768 A | 4/1999 | Speit | |
| 6,111,821 A | 8/2000 | Bach | |
| 8,158,543 B2 | 4/2012 | Dejneka et al. | |
| 8,312,789 B2 | 11/2012 | Beck | |
| 8,349,455 B2 | 1/2013 | Kondo et al. | |
| 8,415,013 B2 | 4/2013 | Barefoot et al. | |
| 8,431,502 B2 | 4/2013 | Dejneka et al. | |
| 8,561,429 B2 | 10/2013 | Allan et al. | |
| 8,586,492 B2 | 11/2013 | Barefoot et al. | |
| 8,623,776 B2 | 1/2014 | Dejneka et al. | |
| 8,652,978 B2 | 2/2014 | Dejneka et al. | |
| 8,756,262 B2 | 6/2014 | Zhang | |
| 8,783,063 B2 | 7/2014 | Osakabe et al. | |
| 8,802,581 B2 | 8/2014 | Dejneka et al. | |
| 8,946,103 B2 | 2/2015 | Dejneka et al. | |
| 8,951,927 B2 | 2/2015 | Dejneka et al. | |
| 8,957,374 B2 | 2/2015 | Liu et al. | |
| 8,969,226 B2 | 3/2015 | Dejneka et al. | |
| 9,140,543 B1 | 9/2015 | Allan et al. | |
| 9,156,724 B2 | 10/2015 | Gross | |
| 9,290,407 B2 | 3/2016 | Barefoot et al. | |
| 9,290,413 B2 | 3/2016 | Dejneka et al. | |
| 9,487,434 B2 * | 11/2016 | Amin ................... | C03C 21/002 |
| 9,567,254 B2 * | 2/2017 | Amin ................... | C03C 21/002 |
| 9,676,663 B2 * | 6/2017 | Amin ................... | C03C 21/002 |
| 9,902,648 B2 * | 2/2018 | Amin ................... | C03C 21/002 |
| 9,908,810 B2 * | 3/2018 | Amin ................... | C03C 21/002 |
| 10,118,858 B2 * | 11/2018 | Amin ................... | C03C 21/002 |
| 10,150,698 B2 * | 12/2018 | Amin ................... | C03C 3/097 |
| 2005/0250639 A1 | 11/2005 | Siebers et al. | |
| 2007/0060465 A1 | 3/2007 | Varshneya et al. | |
| 2009/0197088 A1 | 8/2009 | Murata | |
| 2010/0003508 A1 | 1/2010 | Arrouy et al. | |
| 2010/0028607 A1 | 2/2010 | Lee et al. | |
| 2010/0087307 A1 | 4/2010 | Murata et al. | |
| 2010/0119846 A1 | 5/2010 | Sawada | |
| 2010/0210442 A1 | 8/2010 | Abramov et al. | |
| 2011/0014475 A1 | 1/2011 | Murata | |
| 2011/0165393 A1 | 7/2011 | Bayne | |
| 2011/0226832 A1 | 9/2011 | Bayne et al. | |
| 2011/0281093 A1 | 11/2011 | Gulati et al. | |
| 2011/0294649 A1 | 12/2011 | Gomez et al. | |
| 2012/0052271 A1 | 3/2012 | Gomez et al. | |
| 2012/0052275 A1 | 3/2012 | Hashimoto et al. | |
| 2012/0135153 A1 | 5/2012 | Osakabe et al. | |
| 2012/0135226 A1 | 5/2012 | Bookbinder et al. | |
| 2012/0171497 A1 | 7/2012 | Koyama et al. | |
| 2012/0196110 A1 | 8/2012 | Murata et al. | |
| 2012/0219792 A1 | 8/2012 | Yamamoto et al. | |
| 2012/0308827 A1 | 12/2012 | Boek et al. | |
| 2012/0321898 A1 | 12/2012 | Meinhardt et al. | |
| 2013/0017380 A1 | 1/2013 | Murata et al. | |
| 2013/0045375 A1 | 2/2013 | Gross | |
| 2013/0101798 A1 | 4/2013 | Hashimoto | |
| 2013/0122260 A1 | 5/2013 | Liang | |
| 2013/0122284 A1 | 5/2013 | Gross | |
| 2013/0183512 A1 | 7/2013 | Gy et al. | |
| 2013/0202868 A1 | 8/2013 | Barefoot et al. | |
| 2013/0224492 A1 | 8/2013 | Bookbinder et al. | |
| 2013/0236666 A1 | 9/2013 | Bookbinder et al. | |
| 2013/0236699 A1 | 9/2013 | Prest et al. | |
| 2013/0240025 A1 | 9/2013 | Bersano et al. | |
| 2013/0309613 A1 | 11/2013 | O'Malley et al. | |
| 2014/0050911 A1 | 2/2014 | Mauro et al. | |
| 2014/0087159 A1 | 3/2014 | Cleary et al. | |
| 2014/0106172 A1 | 4/2014 | Dejneka et al. | |
| 2014/0113141 A1 | 4/2014 | Yamamoto et al. | |
| 2014/0139978 A1 | 5/2014 | Kwong | |
| 2014/0150525 A1 | 6/2014 | Okawa et al. | |
| 2014/0193606 A1 | 7/2014 | Kwong | |
| 2014/0227524 A1 | 8/2014 | Ellison et al. | |
| 2014/0370264 A1 | 12/2014 | Ohara et al. | |
| 2015/0011811 A1 | 1/2015 | Pavone et al. | |
| 2015/0030834 A1 | 1/2015 | Morey et al. | |
| 2015/0030838 A1 | 1/2015 | Sellier et al. | |
| 2015/0079398 A1 * | 3/2015 | Amin ................... | C01B 21/068 428/408 |
| 2015/0132563 A1 | 5/2015 | O'Malley et al. | |
| 2015/0147575 A1 | 5/2015 | Dejneka et al. | |
| 2015/0183680 A1 | 7/2015 | Barefoot et al. | |
| 2015/0239775 A1 | 8/2015 | Amin et al. | |
| 2015/0239776 A1 | 8/2015 | Amin et al. | |
| 2015/0259244 A1 | 9/2015 | Amin et al. | |
| 2015/0368148 A1 | 12/2015 | Duffy et al. | |
| 2015/0368153 A1 | 12/2015 | Pesansky et al. | |
| 2016/0122240 A1 | 5/2016 | Oram et al. | |

FOREIGN PATENT DOCUMENTS

| | | |
|---|---|---|
| EP | 700879 A | 3/1996 |
| EP | 2415724 | 8/2012 |
| GB | 1334828 | 10/1973 |
| JP | 2009099239 | 5/2009 |
| JP | 2010202514 | 9/2010 |
| JP | 2011213576 A | 10/2011 |
| WO | 2005091021 | 9/2005 |
| WO | 2011077756 | 6/2011 |
| WO | 2011149811 | 12/2011 |
| WO | 2012126394 | 9/2012 |
| WO | 2013047679 A1 | 4/2013 |
| WO | 2013184205 | 12/2013 |

(56) References Cited

FOREIGN PATENT DOCUMENTS

| WO | 2015127483 | 8/2015 |
|---|---|---|
| WO | 2016070048 | 5/2016 |

OTHER PUBLICATIONS

Amin et al; U.S. Appl. No. 14/926,425, filed Oct. 29, 2015, titled "Strengthened Glass With Ultra-Deep Depth of Compression".

ASTM C1279-13 "Standard Test Method for Non-Destructive Photoelastic Measurement of Edge and Surface Stresses in Annealed, Heat-Strengthened, and Fully Tempered Flat Glass".

ASTM C1422/C1422M—10 "Standard Specification for Chemically Strengthened Flat Glass".

Bahlawane "Novel sol-gel process depositing a-Al2O3 for the improvement of graphite oxidation-resistance" Thin Solid Films, vol. 396, pp. 126-130, 2001.

Dessler et al; "Differences between films and monoliths of sol-gel derived aluminas", Thin Solid Films, vol. 519, pp. 42-51, 2010.

Fu et al, "Preparation of alumina films from a new sol-gel route" Thin Solid films 348, pp. 99-102 (1999).

Hauk "Sol-gel preparation of scratch-resistant Al2O3 coatings on float glass", Glass Science and Technology: Glastechnische Berichte, 72(12), pp. 386, 1999.

International Search Report and the Written Opinoin of the International Searching Authority; PCT/SU2015/035448; dated Sep. 18, 2015; 11 Pages.

International Search Report and the Written Opinoin of the International Searching Authority; PCT/US2015/023507 Search Report; 19 Pages.

International Search Report and the Written Opinoin of the International Searching Authority; PCT/US2015/034996 Search Report dated Jan. 4, 2016; 13 Pages.

International Search Report and the Written Opinoin of the International Searching Authority; PCT/US2015/058322; dated Jan. 8, 2016; 14 Pages.

International Search Report and the Written Opinoin of the International Searching Authority; PCT/US2015/058919 Search Report dated Jan. 11, 2016; 11 Pages.

Oram et al; U.S. Appl. No. 14/932,411, filed Nov. 4, 2015, Titled "Deep Non-Frangible Stress Profiles and Methods of Making".

PCTUS2015041976 Search Report dated Oct. 29, 2015.

Pflitsch et al; "Sol-gel deposition of chromium doped aluminum oxide films (Ruby) for surface temperature sensor application", Chem. Mater., vol. 20, pp. 2773-2778, 2008.

Stosser et al; "Magnetic Resonance investigation of the process of corundum formation starting from sol-gel precursors", J. Am. Ceram. Soc, vol. 88, No. 10, pp. 2913-2922, 2005.

International Search Report and Written Opinion PCT/US2016/034634 dated Nov. 2, 2016.

Machine Translation of JP2017502188 Office Action dated Jul. 3, 2019, Japan Patent Office, 3 Pgs.

Japanese Patent Application No. 2017502202; Machine Translation of the Office Action dated Oct. 2, 2019; Japan Patent Office; 3 pages.

* cited by examiner

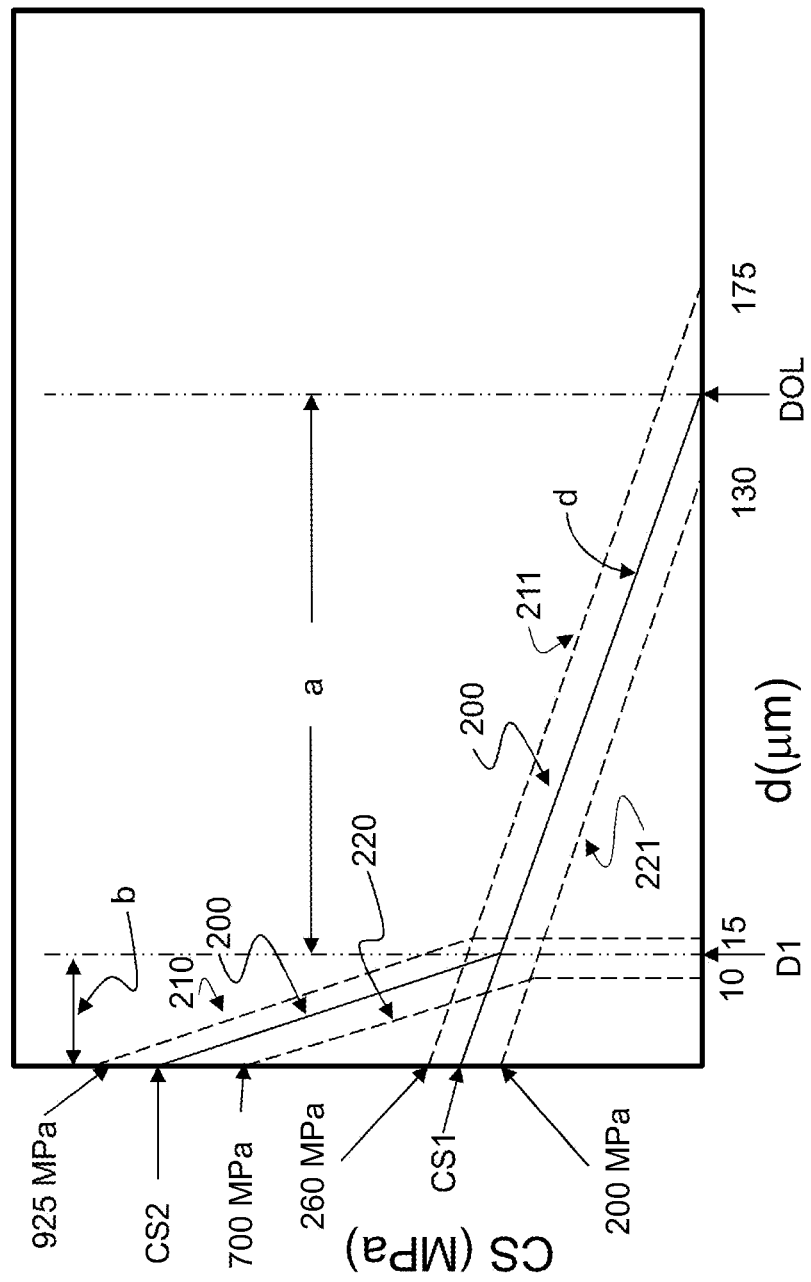

STRENGTHENED GLASS WITH DEEP DEPTH OF COMPRESSION

This application is a continuation of U.S. patent application Ser. No. 14/723,815, filed May 28, 2015, which is a continuation-in-part of U.S. patent application Ser. No. 14/530,073, filed on Oct. 31, 2014, which claims the benefit of priority under 35 U.S.C. § 119 of U.S. Provisional Patent Application Ser. No. 61/943,758, filed on Feb. 24, 2014; U.S. Provisional Patent Application Ser. No. 62/014,464, filed on Jun. 19, 2014; U.S. Provisional Patent Application Ser. No. 62/014,372, filed on Jun. 19, 2014; and U.S. Provisional Patent Application Ser. No. 62/029,075, filed on Jul. 25, 2014, the contents of each are relied upon and incorporated herein by reference in its entirety.

BACKGROUND

The disclosure relates to a chemically strengthened glass article. More particularly, the disclosure relates to chemically strengthened glasses having a deep compressive surface layer.

Strengthened glasses are widely used in electronic devices as cover plates or windows for portable or mobile electronic communication and entertainment devices, such as cellular phones, smart phones, tablets, video players, information terminal (IT) devices, laptop computers and the like, as well as in other applications. As strengthened glasses become more widely used, it has become more important to develop strengthened glass materials having improved survivability, especially when subjected to tensile stresses and/or relatively deep flaws caused by contact with hard and/or sharp surfaces.

SUMMARY

Chemically strengthened glass articles having at least one deep compressive layer extending from a surface of the glass article to a depth of layer (DOL) in a range from about 130 μm up to about 175 μm or, alternatively, to a depth of compression (DOC) in a range from about 90 μm to about 120 μm within the article are provided. The compressive stress profile may, in some embodiments, include a single linear segment extending from the surface to the depth of layer DOL or depth of compression DOC. Alternatively, the compressive stress profile may include two approximately linear portions: the first portion extending from the surface to a relatively shallow depth and having a relatively steep slope; and a second portion extending from the shallow depth to the depth of compression. The strengthened glass has a 50% survival rate when dropped from a height of 80 cm in an inverted ball drop test and an equibiaxial flexural strength of at least 12 kgf and, in some embodiments, at least 27 kgf as determined by abraded ring-on-ring testing. Methods of achieving such stress profiles are also described.

One aspect of the disclosure is to provide a glass article having thickness t in a range from about 75 μm to about 85 μm, and a compressive region extending from a surface of the glass article to a depth of layer DOL, which is in a range from about 135 μm to about 175 μm. The compressive region has a compressive stress profile that includes a first portion a extending from at least a first depth D1 to the depth of layer DOL, where 10 μm≤D1≤13 μm. The compressive stress CS1 at a depth d within the first portion is given by the expression 200 MPa−d·1.54 MPa/μm≤CS2≤260 MPa−d·1.49 MPa/μm, where d is expressed in microns (μm) and d>D1. When extrapolated to the surface (i.e., zero depth), the compressive stress CS1 is in a range from about 200 MPa to about 260 MPa. The compressive stress profile also includes a second portion b extending from the surface of the glass article to the first depth D1. The second portion is substantially linear, having a slope $m_2$ from the surface to a depth of about 5 μm, wherein, in some embodiments, −105 MPa/μm≤$m_2$≤−54 MPa/μm and, in other embodiments, −74.00 MPa/μm≤$m_2$≤−70.00 MPa/μm. The compressive stress profile has a maximum compressive stress CS2 at the surface, where CS2 is in a range from about 700 MPa to about 925 MPa.

In another aspect, an alkali aluminosilicate glass comprising at least about 4 mol % $P_2O_5$ and from 0 mol % to about 5 mol % $B_2O_3$, wherein 1.3<[($P_2O_5$+$R_2O$)/$M_2O_3$]≤2.3, where $M_2O_3$=$Al_2O_3$+$B_2O_3$, and $R_2O$ is the sum of monovalent cation oxides present in the alkali aluminosilicate glass, is provided. The glass has a thickness t in a range from about 0.75 mm up to about 0.85 mm and has a compressive region extending from a surface of the glass to a depth of layer DOL, which is in a range from about 130 μm to about 175 μm. The compressive region has a compressive stress profile that includes a first portion a under a compressive stress CS1 and extending from at least a first depth D1 to the depth of layer DOL, where 10 μm≤D1≤13 μm. The compressive stress CS1 at a depth d within the first portion is given by the expression 200 MPa−d·1.54 MPa/μm≤CS1≤260 MPa−d·1.49 MPa/μm, where d is expressed in microns (μm) and d>D1. The compressive stress profile may be linear at the depth d. When extrapolated from the depth d to the surface (i.e., zero depth) of the glass article, the compressive stress CS1 is in a range from about 200 MPa to about 260 MPa at zero depth. The compressive stress profile also includes a second portion b that extends from the surface of the glass article to the first depth D1. The second portion is substantially linear, having a slope $m_2$ from the surface of the glass article to a depth of about 5 μm, wherein in some embodiments −105 MPa/μm≤$m_2$≤−55 MPa/μm and, in other embodiments, −74.00 MPa/μm≤$m_2$≤−70.00 MPa/μm. The compressive stress profile has a maximum compressive stress CS2 at the surface, where CS2 is in a range from about 700 MPa to about 925 MPa.

Yet another aspect of the disclosure is to provide a glass article having a thickness t in a range from about 75 μm to about 85 μm, and a compressive region extending from a surface of the glass article to a depth of compression DOC in a range from about 90 μm to about 120 μm. The compressive stress profile includes a first portion a under a compressive stress CS1, the first portion a extends from at least a first depth D1 to the depth of compression DOC, where 10 μm≤D1≤13 μm. The compressive stress CS1 at a depth d within the second portion is given by the expression 200 MPa−d·1.54 MPa/μm≤CS1≤260 MPa−d·1.49 MPa/μm, where d is expressed in microns (μm) and d>D1. The compressive stress profile may be linear at the depth d. When extrapolated from the depth d to the surface (i.e., zero depth) of the glass article, the compressive stress CS1 is in a range from about 200 MPa to about 260 MPa at zero depth. The compressive stress profile also includes a second portion b that extends from the surface of the glass article to the first depth D1. The second portion is substantially linear, having a slope $m_2$ from the surface of the glass article to a depth of about 5 μm, wherein −105 MPa/μm≤$m_2$≤−54 MPa/μm in some embodiments and, in other embodiments, −74.00 MPa/μm≤$m_2$≤−70.00 MPa/μm. The compressive stress profile has a maximum compressive stress CS2 at the surface of the glass article, where CS2 is in a range from about 700 MPa to about 925 MPa.

In yet another aspect, a glass article having a thickness t in a range from about 0.75 mm to about 0.85 mm and a compressive region extending from a surface of the glass article to a depth of layer DOL in a range from 130 µm to 175 µm is provided. The glass article has a compressive stress profile comprising: a first portion extending from at least a first depth D1, where 10 µm≤D1≤13 µm. The second portion is linear at a depth d in a range from D1 to the depth of layer DOL and has a slope $m_2$, where −1.54 MPa/µm≤$m_2$≤−1.49 MPa/µm. The compressive stress CS1 is in a range from about 200 MPa to about 260 MPa when extrapolated from the depth d to the surface (i.e., zero depth). The compressive stress profile also includes a second portion b that extends from the surface of the glass article to the first depth D1. The second portion is substantially linear, having a slope $m_2$ from the surface of the glass article to a depth of about 5 µm, wherein −105 MPa/µm≤$m_2$≤−54 MPa/µm in some embodiments and, in other embodiments, −74.00 MPa/µm≤$m_2$≤−70.00 MPa/µm. The compressive stress profile has a maximum compressive stress CS2 at the surface, where CS2 is in a range from about 700 MPa to about 925 MPa.

These and other aspects, advantages, and salient features will become apparent from the following detailed description, the accompanying drawings, and the appended claims.

BRIEF DESCRIPTION OF THE DRAWINGS

FIG. 2a is a schematic representation of a compressive stress profile obtained by a two-step ion exchange process;

DETAILED DESCRIPTION

Figure 1:
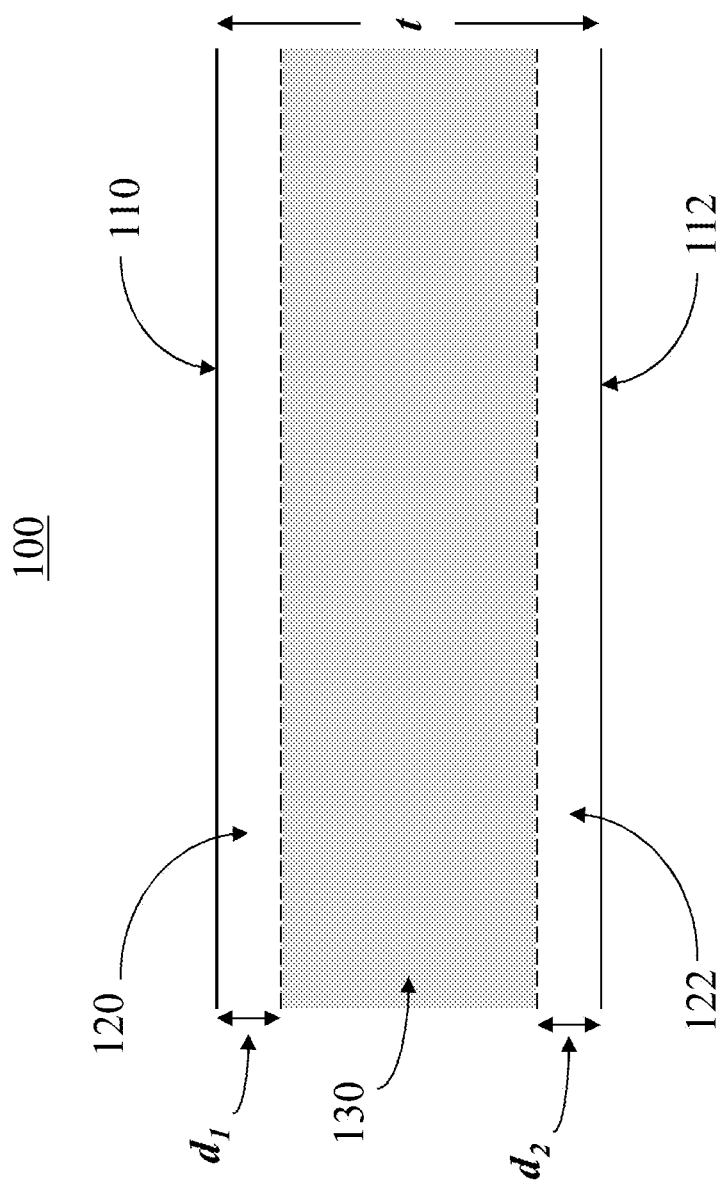
FIG. 1 is a schematic cross-sectional view of a chemically strengthened glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all glass compositions are expressed in terms of mole percent (mol %) and all ion exchange bath compositions are expressed in terms of weight percent (wt %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of $Li_2O$," for example, is one in which $Li_2O$ is not actively added or batched into the glass, but may be present in very small amounts as a contaminant; i.e., less than 0.1 mol %. "Free of $Li_2O$" means that the glass contains 0 mol % $Li_2O$.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "depth of layer" and "DOL" refer to the depth of the compressive layer as determined by surface stress meter (FSM) measurements using commercially available instruments such as the FSM-6000 stress meter.

As used herein, the terms "depth of compression" and "DOC" refer to the depth at which the stress within the glass changes from compressive to tensile stress. At the DOC, the stress crosses from a positive (compressive) stress to a negative (tensile) stress and thus has a value of zero. The depth of compression DOC is determined from the spectra of bound optical modes for TM and TE polarization by using the inverse Wentzel-Kramers-Brillouin (IWKB) method.

As described herein, compressive stress (CS) and central tension (CT) are expressed in terms of megaPascals (MPa), depth of layer (DOL) and depth of compression (DOC) are expressed in terms of microns (µm), where 1 µm=0.001 mm, and thickness t is expressed herein in terms of millimeters, where 1 mm=1000 µm, unless otherwise specified.

As used herein, the term "fracture," unless otherwise specified, means that a crack propagates through the entire thickness and/or across the entire surface of a substrate when that substrate is dropped on or impacted with an object.

According to the scientific convention normally used in the art, compression is expressed as a negative (<0) stress and tension is expressed as a positive (>0) stress. Throughout this description, however, compressive stress CS is expressed as a positive or absolute value—i.e., as recited herein, CS=|CS| and central tension or tensile stress is expressed as a negative value in order to better visualize the compressive stress profiles described herein.

As used herein, the "slope (m)" refers to the slope of a segment or portion of the stress profile that closely approximates a straight line. The predominant slope is defined as the average slope for regions that are well approximated as straight segments. These are regions in which the absolute value of the second derivative of the stress profile is smaller than the ratio of the absolute value of the first derivative, and approximately half the depth of the region. For a steep, shallow segment of the stress profile near the surface of the strengthened glass article, for example, the essentially straight segment is the portion for each point of which the absolute value of the second derivative of the stress profile is smaller than the absolute value of the local slope of the stress profile divided by the depth at which the absolute value of the stress changes by a factor of 2. Similarly, for a segment of the profile deeper within the glass, the straight portion of the segment is the region for which the local second derivative of the stress profile has an absolute value that is smaller than the absolute value of the local slope of the stress profile divided by half the DOC.

For typical stress profiles, this limit on the second derivative guarantees that the slope changes relatively slowly with depth, and is therefore reasonably well defined and can be used to define regions of slope that are important for the stress profiles that are considered advantageous for drop performance.

Let the stress as profile a function of depth x be given by the function $$\sigma = \sigma(x) \quad (1),$$

and let the first derivative of the stress profile with respect to depth be $$\sigma' = \frac{d\sigma}{dx}, \quad (2)$$

and the second derivative be $$\sigma'' = \frac{d^2\sigma}{dx^2}. \quad (3)$$

If a shallow segment extends approximately to a depth $d_s$, then for the purposes of defining a predominant slope, a straight portion of the profile is a region where $$|\sigma''(x)| < \left|2\frac{\sigma'(x)}{d_s}\right|. \quad (4)$$

If a deep segment extends approximately to a larger depth DOC, or to a larger depth $d_d$, or to a depth DOL in traditional terms, then a straight portion of the profile is a region where $$|\sigma''(x)| < \left|2\frac{\sigma'(x)}{d_d}\right| \approx \left|2\frac{\sigma'(x)}{DOC}\right| \approx \left|2\frac{\sigma'(x)}{DOL}\right|. \quad (5)$$

The latter equation is also valid for a 1-segment stress profile obtained by a single ion exchange in a salt containing only a single alkali ion other than the ion being replaced in the glass for chemical strengthening.

Preferably, the straight segments are selected as regions where $$|\sigma''(x)| < \left|\frac{\sigma'(x)}{d}\right|, \quad (6)$$

where d stands for the relevant depth for the region, shallow or deep.

The slope m of linear segments of the compressive stress profiles described herein are given as absolute values of the slope $$\frac{d\sigma}{dx}$$

i.e., m, as recited herein, is equal to $$\left|\frac{d\sigma}{dx}\right|.$$

More specifically, the slope m represents the absolute value of the slope of a profile for which the compressive stress generally decreases as a function of increasing depth.

Described herein are glass articles that are chemically strengthened by ion exchange to obtain a prescribed compressive stress profile and thus achieve survivability when dropped onto a hard, abrasive surface from a prescribed height.

Compressive stress CS and depth of layer DOL are stress profile parameters that have been used to enable quality control of chemical strengthening. Compressive stress CS provides an estimate of the surface compression, an important parameter that correlates well with the amount of stress that needs to be applied to cause a failure of a glass article, particularly when the glass is free of deep mechanical flaws. Depth of layer DOL has been used as an approximate measure of the depth of penetration of the larger (strengthening) cation (e.g., $K^+$ during $K^+$ for $Na^+$ exchange), with larger DOL values correlating well with greater depths of the compression layer, protecting the glass by arresting deeper flaws, and preventing flaws from causing failure under conditions of relatively low externally applied stress.

Even with minor to moderate bending of a glass article, the bending moment induces a stress distribution that is generally linear with depth from the surface, having a maximum tensile stress on the outer side of bending, a maximum compressive stress on the inner side of the bending, and zero stress at the so-called neutral surface, which is usually in the interior. For tempered glass parts, this bending-induced constant-slope stress distribution is added to the tempering stress profile to result in the net stress profile in the presence of external (bending) stress.

The net stress profile in the presence of bending-induced stress within the glass article generally has a different depth of compression DOC from the stress profile without such bending. In particular, the depth of compression DOC is reduced on the outer side of the glass article during of bending. If the tempering stress profile has a relatively small stress slope at depths in the vicinity of and smaller than the DOC, the DOC can substantially decrease in the presence of bending. In the net stress profile, the tips of moderately deep flaws could be exposed to tension, while the same flaw tips would normally be arrested in the compression region of the stress profile without bending. These moderately deep flaws can thus grow and lead to fracture during bending.

Bending stresses are also important during drop testing. Regions of localized time-varying stress occur during mechanical vibrations and wave propagation through the glass article. With increasing drop height, the glass article experiences higher time-variable stresses during contact with the impact surface as well as during vibrations occurring after contact. Thus, some fracture failures may occur due to excessive post-contact tensile stress occurring at the tip of a relatively shallow flaw that would normally be innocuous in the presence of tempering without these time-variable stresses.

The present disclosure describes a range of slopes that provides a good trade-off between performance of the glass article during drop tests and/or bending tests. The preferable ranges may in some cases be partially defined or limited by the capabilities and limitations of stress measurement equipment (such as, for example, the FSM-6000 stress meter) for collection and interpretation of spectra associated with these profiles for the purposes of quality control during production. Not only the depth of layer DOL, but also the slope of the stress profile (through the slope of the index profile associated with the stress profile), affect the ability to resolve particular lines in the coupling spectra, and thus effectively control product quality.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. The compressive layer extends from the surface to a depth within the glass.

A cross-sectional schematic view of a planar ion exchanged glass article is shown in FIG. 1. Glass article 100 has a thickness t, first surface 110, and second surface 112. In some embodiments, glass article 100 has a thickness t ranging from about 0.75 mm up to about (i.e., less than or equal to) 0.85 mm. While the embodiment shown in FIG. 1 depicts glass article 100 as a flat planar sheet or plate, glass article 100 may have other configurations, such as a three dimensional shape or other non-planar configurations. Glass article 100 has a first compressive region 120 extending from first surface 110 to a depth of compression DOC (or depth of layer DOL) $d_1$ into the bulk of the glass article 100. In the embodiment shown in FIG. 1, glass article 100 also has a second compressive region 122 extending from second surface 112 to a second depth of compression DOC (or depth of layer DOL) $d_2$. Glass article 100 also has a central region 130 that extends from $d_1$ to $d_2$. Central region 130 is under a tensile stress, having a maximum value at the center of the central region 130, referred to as central tension or center tension (CT). The tensile stress of region 130 balances or counteracts the compressive stresses of regions 120 and 122. The depths $d_1$, $d_2$ of first and second compressive regions 120, 122 protect the glass article 100 from the propagation of flaws introduced by sharp impact to first and second surfaces 110, 112 of glass article 100, while the compressive stress minimizes the likelihood of a flaw growing and penetrating through the depth $d_1$, $d_2$ of first and second compressive regions 120, 122.

The strengthened glass articles described herein have a maximum compressive stress CS2 in a range from about 700 megaPascals (MPa) up to about 925 MPa surface of the glass. The maximum compressive stress $CS_2$ is located at the ion exchanged surface (110, 112 in FIG. 1) of the glass article. Each compressive region (120, 122) extends from the ion exchanged surface 110, 112 of the glass article to a depth of compression DOC, where 90 µm≤DOC≤120 µm. Alternatively, each compressive region (120, 122) extends from the surface of the glass article to a depth of layer DOL in a range from about 130 µm to about 175 µm and, in some embodiments, from about 130 µm to about 155 µm.

The glasses described herein have a compressive stress profile that varies as a function of depth below the surface of the strengthened glass article, producing a compressive stress profile in the compressive region. Whereas the following discussion describes a compressive stress profile extending from a single surface of the glass article, it is understood that, unless otherwise specified, other equivalent (e.g., parallel) surfaces have compressive stress profiles similar or identical to the stress profile described for a single surface. For example, the parallel surfaces 110, 112 of the ion exchanged article 100 (FIG. 1) have identical compressive stress profiles.

The compressive stress profile comprises two substantially linear functions, and is schematically shown in FIG. 2a. Compressive stress profile 200 comprises a first portion a, which extends from depth D1 to the depth of layer DOL, or, in some embodiments, to the depth of compression DOC. The compressive stress profile 200 in portion a is limited by upper and lower boundaries 211 and 221, respectively. The depth of layer DOL is in a range from about 130 µm to about 175 µm and, in some embodiments, from about 130 µm to about 155 µm, whereas the depth of compression DOC is in a range from about 90 µm to about 120 µm. The first portion a of the compressive stress profile 200 is also substantially linear with slope $m_1$ from a depth d, which is greater than or equal to D1 and is less than or equal to the depth of layer DOL, or, alternatively, the depth of compression DOC (i.e., D1≤d≤DOL, or D1≤d≤DOC), where D1, d, DOL, and DOC are given in microns. When extrapolated to the surface (i.e., zero depth) from the depth d, the compressive stress CS1 zero depth is in a range from about 200 MPa to about 260 MPa. Given the linear stress profile in terms of the depth of layer DOL, the compressive stress CS1 at depth d in this range may be derived from the equation $$200 \text{ MPa} - d \cdot 1.54 \text{ MPa/µm} \leq CS1 \leq 260 \text{ MPa} - d \cdot 1.49 \text{ MPa/µm} \quad (7).$$

Based on equation (7), the compressive stress CS1 at D1 is in a range from about 185 MPa up to about 240 MPa. In terms of the depth of compression DOC, the compressive stress CS1 at depth d in the region from D1 to DOC is given by the expression $$260 \text{ MPa} - 2.89d \text{ MPa/µm} \geq CS1 \geq 200 \text{ MPa} - 1.67d \text{ MPa/µm} \quad (8).$$

Based on equation (8), the compressive stress CS1 of first portion a at D1 is in a range from about 171 MPa up to about 238 MPa or, in some embodiments from about 183 MPa to about 231 MPa, or, in still other embodiments, from about 178 MPa to about 222 MPa. In other embodiments, the compressive stress CS1 at depth d in the region from D1 to DOC is given by the expression $$260 \text{ MPa} - 2.17d \text{ MPa/µm} \geq CS1 \geq 200 \text{ MPa} - 2.22d \text{ MPa/µm} \quad (9).$$

Based on equation (9), the compressive stress CS1 of first portion a at D1 is in a range from about 171 MPa up to about 238 MPa or, in some embodiments, from about 238 to about 178 MPa, or, in still other embodiments, from about 232-171 MPa.

The compressive stress profile 200 also includes a second portion b extending from the ion exchanged surface (surface; d=0 μm) of the glass to a depth D1 below the surface of the glass. In some embodiments, D1 is in a range from about 10 μm to about 13 μm (i.e., 10 μm≤D1≤13 μm). The actual position of depth D1 will depend at least in part on whether it is being determined with respect to the depth of layer DOL or depth of compression DOC. The first portion of the compressive stress profile 200 is substantially linear from the surface to a depth of about 5 μm, and has a slope $m_2$ in this segment. The compressive stress profile 200 in portion a is limited by upper and lower boundaries 210, 220, respectively. When the compressive stress profile 200 is expressed in terms of depth of layer DOL, the slope $m_2$ is in a range from about −55 MPa/μm to about −105 MPa/μm (i.e., −55 MPa/μm≤$m_2$≤−105 MPa/μm) and, in some embodiments, from about −74.00 MPa/μm to about −70.00 MPa/μm (i.e., −74.00 MPa/μm≤$m_2$≤−70.00 MPa/μm). When the compressive stress profile is expressed in terms of depth of compression DOC, the slope $m_2$ is in a range from about −55 MPa/μm to about −105 MPa/μm (i.e., −55 MPa/μm≤$m_2$≤−105 MPa/μm).

It will be appreciated by those skilled in the art that the present disclosure is not limited to compressive stress profiles consisting of only two distinct portions. Instead, the compressive stress profile may include additional segments. In some embodiments, different linear portions or segments of the compressive stress profile may be joined by a transitional region (not shown) in which the slope of the profile transitions from a first slope to a second slope (e.g., from $m_2$ to $m_1$).

As shown in FIG. 2a, the slope of second portion b of the compressive stress profile is much steeper than the slope of first portion a; i.e., $|m_2|\gg|m_1|$. This corresponds to a condition in which a compressive stress profile having a "spike" at the surface of the glass article is created by multiple ion exchange processes carried out in succession in order to provide the surface with sufficient compressive stress to withstand the introduction or growth of some flaws produced through impact.

Compressive stress CS and depth of the compressive layer (referred to as "depth of layer" or DOL) are measured using those means known in the art. Such means include, but are not limited to, measurement of surface stress (FSM) using commercially available instruments such as the FSM-6000 stress meter, manufactured by Luceo Co., Ltd. (Tokyo, Japan), or the like. Methods of measuring compressive stress CS and depth of layer DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. The stress optical coefficient in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The relationship between CS and central tension CT may, in some embodiments, be approximated by the expression:

$$CT=(CS \cdot DOL)/(t-2\ DOL) \quad (10),$$

where t is the thickness, expressed in microns (μm), of the glass article. In various sections of the disclosure, central tension CT and compressive stress CS are expressed herein in megaPascals (MPa), thickness t is expressed in either microns (μm) or millimeters (mm), and depth of layer DOL is expressed in microns (μm) or millimeters (mm), consistent with the representation of t.

For strengthened glass articles in which the compressive stress layers extend to deeper depths within the glass, the FSM technique may suffer from contrast issues that affect the observed DOL value. At deeper DOL values, there may be inadequate contrast between the TE and TM spectra, thus making the calculation of the difference between TE and TM spectra—and thus determining DOL—more difficult. Moreover, FSM software analysis is incapable of determining the compressive stress profile (i.e., the variation of compressive stress as a function of depth within the glass). In addition, the FSM technique is incapable of determining the depth of layer resulting from the ion exchange of certain elements such as, for example, the ion exchange of sodium for lithium.

The DOL as determined by the FSM is a relatively good approximation for the depth of compression (DOC) when the DOL is a small fraction r of the thickness t and the index profile has a depth distribution that is reasonably well approximated with a simple linear truncated profile. When the DOL is a substantial fraction of the thickness, such as DOL≥0.1·t, then the DOC is often noticeably lower than the DOL. For example, in the idealized case of a linear truncated profile, the relationship DOC=DOL (1−r) holds, where r=DOL/t.

Most TM and TE index profiles have a curved portion near the bottom of the index profile, and the relationship between DOC and DOL then may be somewhat more involved, but generally the ratio DOC/DOL decreases as r increases. For some profile shapes—particularly when r<0.02—it is possible to have even DOC≥DOL.

When the concentration profile of the larger (strengthening) cation (e.g., $K^+$) introduced by ion exchange has two segments, with the segment nearest the surface having a substantially higher concentration, and the segment spread over large depths and having a substantially lower concentration, the DOL determined by the FSM is significantly smaller than the overall depth of chemical penetration of the larger ion. This is in contrast with the case of a simple one-segment diffusion profile in which the DOL provides a good estimate of the chemical penetration. In a two-segment profile, the DOC may be larger or smaller than the DOL, depending on the depth and stress parameters of the profile and on the thickness.

When low external stresses are applied to a strengthened glass, the fracture-causing flaws have depths that correlate better the DOC rather than with DOL. The reason why DOL has been used as a high-value parameter of chemical strengthening is that for simple single-segment stress profiles, the DOL has had a good correlation with DOC. In addition, the DOC and the DOL have been similar, since in many instances the DOL is generally lower than 0.1·t and, for the most part, lower than 0.05·t. Thus, for traditional chemically-strengthened glass, the DOL has had good correlation with the depth of strength-limiting flaws.

With the increasing use of thinner cover glasses (e.g., having t<0.5 mm) and the introduction of deeper and more complex stress profiles aimed at improving drop performance while preserving high strength under high-stress tests such as ring-on-ring (ROR), abraded ring-on-ring (AROR), and four-point-bend (4PB), the depth of layer DOL deviates significantly from the depth of compression DOC. Fracture-inducing flaws under conditions of low external stress often occur at depths smaller than the DOL, but are consistent with the DOC.

The techniques described below have been developed to more accurately determine the depth of compression (DOC) and compressive stress profiles for strengthened glass articles.

Two methods for extracting detailed and precise stress profiles (stress as a function of depth) of tempered or chemically strengthened glass are disclosed in U.S. patent application Ser. No. 13/463,322, entitled "Systems And Methods for Measuring the Stress Profile of Ion-Exchanged Glass" (referred to hereinafter as "Roussev I"), filed by Rostislav V. Roussev et al. on May 3, 2012, and claiming priority to U.S. Provisional Patent Application No. 61/489,800, having the same title and filed on May 25, 2011. The spectra of bound optical modes for TM and TE polarization are collected via prism coupling techniques and used in their entirety to obtain detailed and precise TM and TE refractive index profiles $n_{TM}(z)$ and $n_{TE}(z)$. In one embodiment, the detailed index profiles are obtained from the mode spectra by using the inverse Wentzel-Kramers-Brillouin (IWKB) method. The contents of the above patent applications are incorporated herein by reference in their entirety.

In another embodiment, the detailed index profiles are obtained by fitting the measured mode spectra to numerically calculated spectra of pre-defined functional forms that describe the shapes of the index profiles and obtaining the parameters of the functional forms from the best fit. The detailed stress profile $S(z)$ is calculated from the difference of the recovered TM and TE index profiles by using a known value of the stress-optic coefficient (SOC):

$$S(z)=[n_{TM}(z)-n_{TE}(z)]/SOC \quad (11).$$

Due to the small value of the SOC, the birefringence $n_{TM}(z)-n_{TE}(z)$ at any depth z is a relatively small fraction (typically on the order of 1%) of either of the indices $n_{TM}(z)$ and $n_{TE}(z)$. Obtaining stress profiles that are not significantly distorted due to noise in the measured mode spectra requires determination of the mode effective indices with a precision on the order of 0.00001 RTU (refractive index units). The methods disclosed in Roussev I further include techniques applied to the raw data to ensure such high precision for the measured mode indices, despite noise and/or poor contrast in the collected TE and TM mode spectra or images of the mode spectra. Such techniques include noise-averaging, filtering, and curve fitting to find the positions of the extremes corresponding to the modes with sub-pixel resolution.

Similarly, U.S. patent application Ser. No. 14/033,954, entitled "Systems and Methods for Measuring Birefringence in Glass and Glass-Ceramics (hereinafter "Roussev II")," filed by Rostislav V. Roussev et al. on Sep. 23, 2013, and claiming priority to U.S. Provisional Application Ser. No. 61/706,891, having the same title and filed on Sep. 28, 2012, discloses apparatus and methods for optically measuring birefringence on the surface of glass and glass ceramics, including opaque glass and glass ceramics. Unlike Roussev I, in which discrete spectra of modes are identified, the methods disclosed in Roussev II rely on analysis of the angular intensity distribution for TM and TE light reflected by a prism-sample interface in a prism-coupling configuration of measurements. The contents of the above patent applications are incorporated herein by reference in their entirety.

In another method, derivatives of the TM and TE signals are determined after application of some combination of the aforementioned signal conditioning techniques. The locations of the maximum derivatives of the TM and TE signals are obtained with sub-pixel resolution, and the surface birefringence is proportional to the spacing of the above two maxima, with a coefficient determined as before by the apparatus parameters.

Associated with the requirement for correct intensity extraction, the apparatus comprises several enhancements, such as using a light-scattering surface (static diffuser) in close proximity to or on the prism entrance surface to improve the angular uniformity of illumination, a moving diffuser for speckle reduction when the light source is coherent or partially coherent, and light-absorbing coatings on portions of the input and output facets of the prism and on the side facets of the prism, to reduce parasitic background which tends to distort the intensity signal. In addition, the apparatus may include an infrared light source to enable measurement of opaque materials.

Furthermore, Roussev II discloses a range of wavelengths and attenuation coefficients of the studied sample, where measurements are enabled by the described methods and apparatus enhancements. The range is defined by $\alpha_s \lambda < 250 \pi \sigma_s$, where $\alpha_s$ is the optical attenuation coefficient at measurement wavelength $\lambda$, and $\sigma_s$ is the expected value of the stress to be measured with typically required precision for practical applications. This wide range allows measurements of practical importance to be obtained at wavelengths where the large optical attenuation renders previously existing measurement methods inapplicable. For example, Roussev II discloses successful measurements of stress-induced birefringence of opaque white glass-ceramic at a wavelength of 1550 nm, where the attenuation is greater than about 30 dB/mm.

While it is noted above that there are some issues with the FSM technique at deeper DOL values, FSM is still a beneficial conventional technique which may utilized with the understanding that an error range of up to +/−20% is possible at deeper DOL values. The terms "depth of layer" and "DOL" as used herein refer to DOL values computed using the FSM technique, whereas the terms "depth of compression" and "DOC" refer to depths of the compressive layer determined by IWKB analysis and the methods described in Roussev I & II.

As stated above, the glass articles may be chemically strengthened by ion exchange. In this process, ions at or near the surface of the glass are replaced by—or exchanged with—larger ions usually having the same valence or oxidation state. In those embodiments in which the glass article comprises, consists essentially of, or consists of an alkali aluminosilicate glass, ions in the surface layer of the glass and the larger ions are monovalent alkali metal cations, such as $Na^+$ (when $Li^+$ is present in the glass), $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, and additional steps such as annealing, washing, and the like, are generally determined by the composition of the glass and the desired depth of layer and compressive stress of to be achieved by the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 470° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The compressive stress is created by chemically strengthening the glass article, for example, by the ion exchange processes previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

The glasses described herein are strengthened in a two-step or dual ion exchange method to produce the compressive stress profile shown in FIG. 2a. The first step of the process, the glass is ion exchanged in a first molten salt bath containing a salt of the larger alkali metal cation. In some embodiments, the molten salt bath contains or consists essentially of salts of the larger alkali metal cation. However, small amounts—in some embodiments, less that about 10 wt %, in some embodiments, less than about 5 wt %, and, in other embodiments less than about 2 wt %—of salts of the smaller alkali metal cation may be present in the bath. In other embodiments, salts of the smaller alkali metal cation may comprise at least about 30 wt %, or at least about 40 wt %, or from about 40 wt % up to about 75 wt % of the ion exchange bath. This first ion exchange step may take place at a temperature of at least about 400° C. and, in some embodiments, at least about 440° C. and less than about 500° C., for a time sufficient to achieve the desired depth of compression DOC. In some embodiments, the first ion exchange step may be conducted for at least eight hours, depending on the composition and temperature of the ion exchange bath.

After completion of the first ion exchange step, the glass is immersed in a second ion exchange bath. The second ion exchange bath is different—i.e., separate from and, in some embodiments, having a different composition—from the first bath. In some embodiments, the second ion exchange bath contains only salts of the larger alkali metal cation, although, in some embodiments small amounts of the smaller alkali metal cation (e.g., 2 wt % or 3 wt %) may be present in the bath. In addition, the immersion time and temperature of the second ion exchange step may differ from those of the first ion exchange step. In some embodiments, the second ion exchange step is carried out at a temperature of at least about 350° C. and, in other embodiments, at least about 380° C. up to about 450° C. The duration of the second ion exchange step is sufficient to achieve the desired depth D1 of the first portion a and, in some embodiments, may be 30 minutes or less. In other embodiments, the duration of the second ion exchange step is 15 minutes or less and, in some embodiments, in a range from about 10 minutes to about 60 minutes.

The second ion exchange bath differs from the first ion exchange bath, in that the second ion exchange step is directed to delivering a different concentration of the larger cation or, in some embodiments, a different cation altogether, to the alkali aluminosilicate glass article than that provided in the first ion exchange step. In one or more embodiments, the second ion exchange bath may comprise at least about 95% by weight of a potassium composition that delivers potassium ions to the alkali aluminosilicate glass article. In a specific embodiment, the second ion exchange bath may comprise from about 98% to about 99.5% by weight of the potassium composition. While it is possible that the second ion exchange bath only comprises at least one potassium salt, the second ion exchange bath may, in further embodiments, comprise 0-5% by weight, or about 0.5-2.5% by weight of at least one sodium salt, for example, $NaNO_3$. In an exemplary embodiment, the potassium salt is $KNO_3$. In further embodiments, the temperature of the second ion exchange step may be 380° C. or greater, and, in some embodiments, up to about 450° C.

The purpose of the second ion exchange step is to form a "spike" or sharply increase the compressive stress in the region immediately adjacent to and at the surface of the glass article, as represented by portion a of the stress profile shown in FIG. 2a. In some embodiments, the maximum compressive stress CS2, which is located at the surface, is in a range from about 700 MPa and about 925 MPa.

Figure 2B:
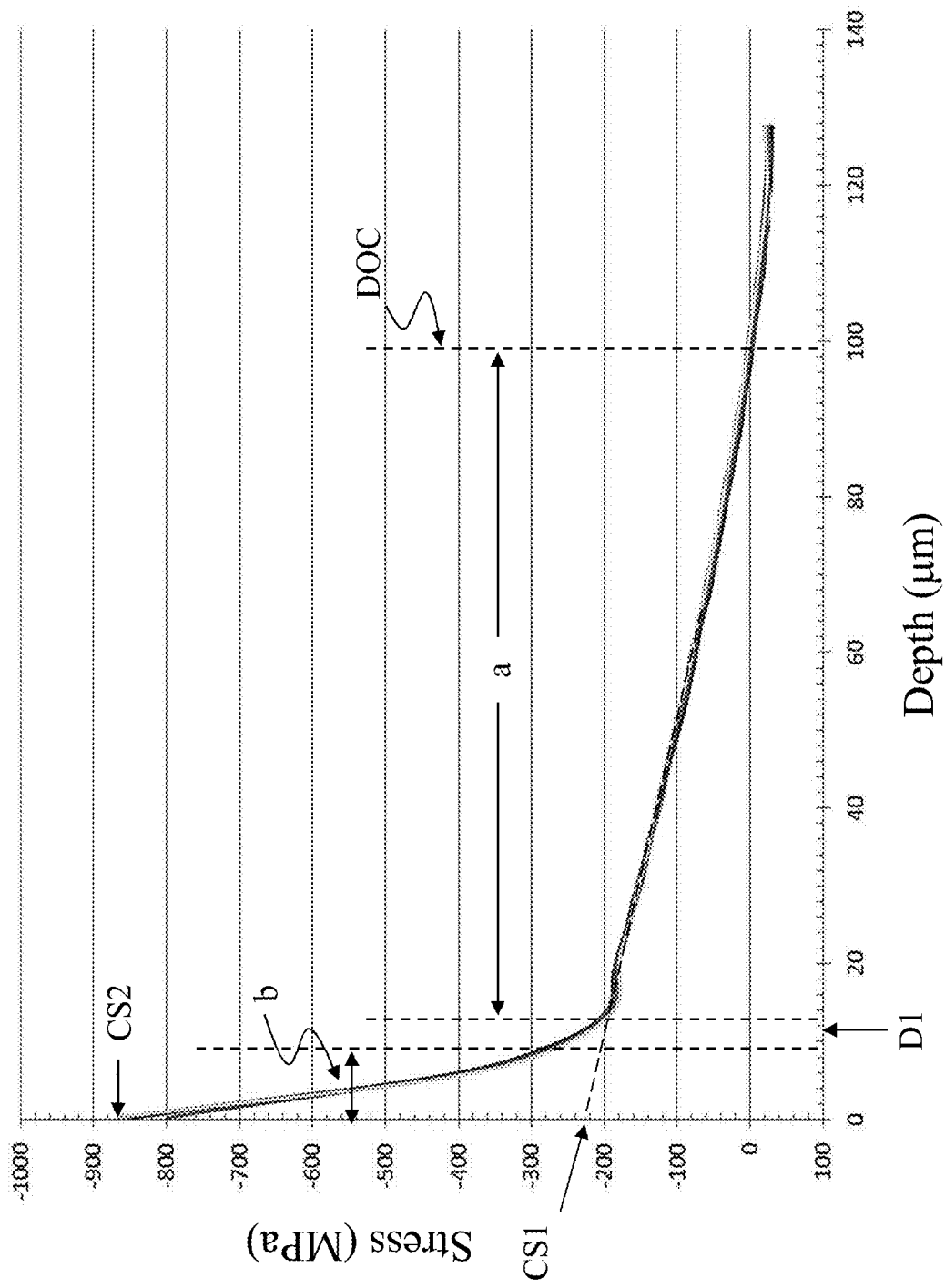
FIG. 2b is a plot of a compressive stress profile as determined from spectra of bound optical modes for TM and TE polarization by using the inverse Wentzel-Kramers-Brillouin (IWKB) method.

FIG. 2b is a plot of stress profiles obtained for alkali aluminosilicate glass samples having the composition 57.43 mol % $SiO_2$, 16.10 mol % $Al_2O_3$, 6.54 mol % $P_2O_5$, 17.05 mol % $Na_2O$, 2.81 mol % MgO, and 0.07 mol % $SnO_2$. The glass is described in U.S. patent application Ser. No. 13/678,013 and U.S. Pat. No. 8,765,262, both cited herein. Each sample represented by the stress profiles was subjected to the two-step ion exchange process described herein. In the first step, the glass samples were first ion exchanged in a molten salt bath comprising 49% $NaNO_3$ and 51% $KNO_3$ by weight at 460° C. for times ranging from 12.5 hours to 14 hours. Following the first ion exchange, the samples were ion exchanged in a molten salt bath comprising 0.5% $NaNO_3$ and 99.5% $KNO_3$ by weight at 390° C. for 15 minutes. The compressive stress profiles obtained for the individual samples nearly exactly overlay each other, attesting to the reproducibility of the two-step ion exchange process that was used to generate the compressive stress profile. The compressive stress profiles depicted in FIG. 2b are analogous to the schematic representation of a stress profile shown in FIG. 2a and possess the following features: a first portion a extending from at least a first depth D1 to a depth of compression DOC; and a second portion b extending from the surface of the strengthened glass sample to a depth that is less than the first depth and having a maximum compressive stress CS2 at the surface of the glass sample. The first portion a has a slope which, when extrapolated, would intercept the stress axis at a compressive stress CS2. The compressive stress CS2 may be interpreted as the surface compressive test achieved by the first ion exchange step in the process.

In one embodiment, glass articles described herein comprise an alkali aluminosilicate glass. The alkali aluminosilicate glass comprises $SiO_2$, $Al_2O_3$, $P_2O_5$, and at least one alkali metal oxide ($R_2O$), wherein $0.75 \leq [(P_2O_5$ (mol %$)+R_2O$ (mol %$))/M_2O_3$ (mol %$)] \leq 1.2$, where $M_2O_3=Al_2O_3+B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010. The contents of the above applications are incorporated herein by reference in their entirety.

In another embodiment, the alkali aluminosilicate glass comprises at least about 4 mol % $P_2O_5$, wherein ($M_2O_3$ (mol %$)/R_xO$(mol %$))<1$, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. In some embodiments, the glass is ion exchanged to a depth of layer of at least about 10 µm and comprises at least about 4 mol % $P_2O_5$, wherein $0.6<[M_2O_3$ (mol %$)/R_xO$(mol %$)]<1.4$ or $1.3<[(P_2O_5+R_2O)/M_2O_3] \leq 2.3$; where $M_2O_3=Al_2O_3+B_2O_3$, $R_xO$ is the sum of monovalent and divalent cation oxides present in the alkali aluminosilicate glass, and $R_2O$ is the sum of monovalent cation oxides present in the alkali aluminosilicate glass. In some embodiments, the glass comprises: from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, wherein $R_xO$ is the sum of the alkali metal oxides, alkaline earth metal oxides, and transition metal monoxides present in the glass; from about 11 to about 30 mol % $M_2O_3$, where $M_2O_3=Al_2O_3+B_2O_3$; from 0 mol % to about 1 mol % $K_2O$; from 0 mol % to about 5 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; and $1.3<[(P_2O_5+R_2O)/M_2O_3] \leq 2.3$, where $R_2O$ is the sum of monovalent cation oxides present in the glass. The glass is described in U.S. patent application Ser. No. 13/678,013 by Timothy M. Gross, entitled "Ion Exchangeable Glass with High Crack Initiation Threshold," filed Nov. 15, 2012, and U.S. Pat. No. 8,765,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of these applications are incorporated herein by reference in their entirety.

In certain embodiments, the alkali aluminosilicate glasses described herein are free of at least one of lithium, barium, arsenic, and antimony. In certain embodiments, the glasses may contain up to about 500 ppm antimony. The glasses may, in some embodiments, may include at least one fining agent such as, but not limited to, $SnO_2$. The total amount of fining agent should not exceed about 1 mol %.

The strengthened glass articles described herein demonstrate improved fracture resistance when subjected to repeated drop tests. The purpose of such drop tests is to characterize the performance of such glass articles in normal use as display windows or cover plates for handheld electronic devices such as cell phones, smart phones, and the like.

The face of the strengthened glass article bends outward in tension rather than inward in compression, upon impact. The inverted ball on sandpaper (IBoS) test is a dynamic component level test that mimics the dominant mechanism for failure due to damage introduction plus bending that typically occurs in strengthened glass articles that are used in mobile or hand held electronic devices. In routine field use, damage introduction (a in FIG. 3b) occurs on the top surface of the glass. Fracture initiates on the top surface of the glass and damage either penetrates the compressive layer (b in FIG. 3b) or the fracture propagates from bending on the top surface or from center tension (c in FIG. 3b). The IBoS test is designed to simultaneously introduce damage to the surface of the glass and apply bending under dynamic load.

Figure 3A:
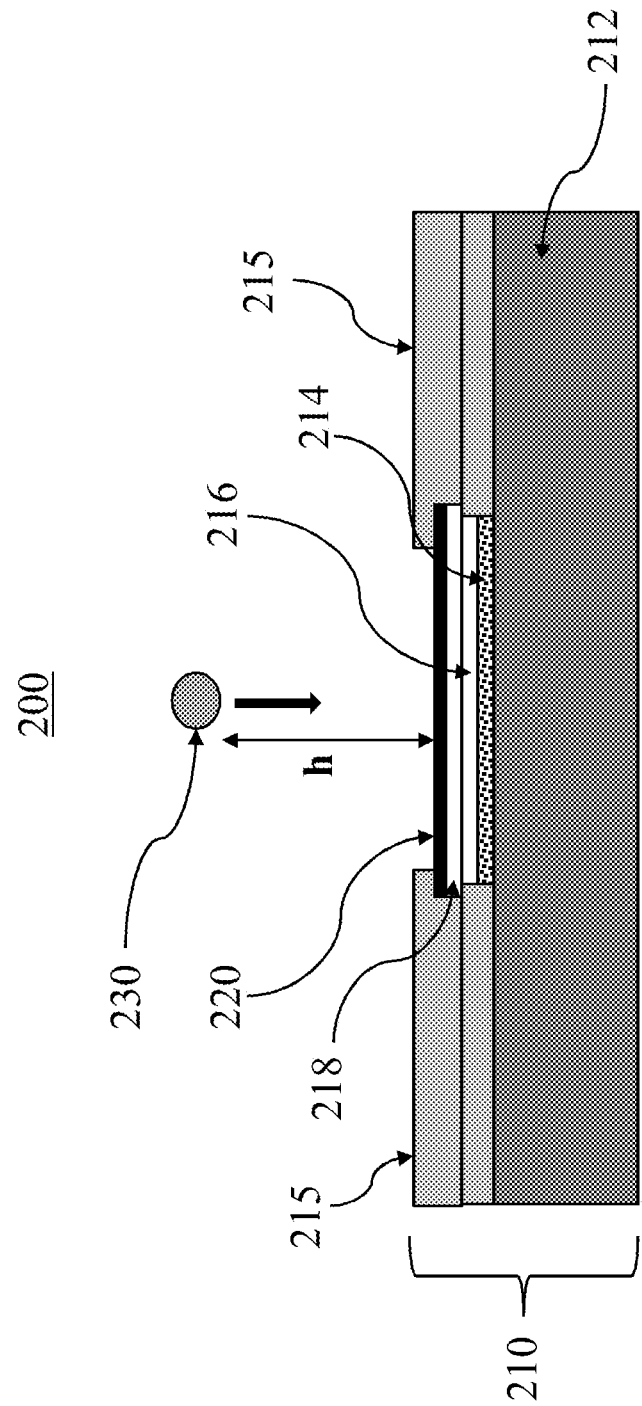
FIG. 3a is a schematic cross-sectional view of an embodiment of the apparatus that is used to perform the inverted ball on sandpaper (IBoS) test described in the present disclosure.
Figure 3B:
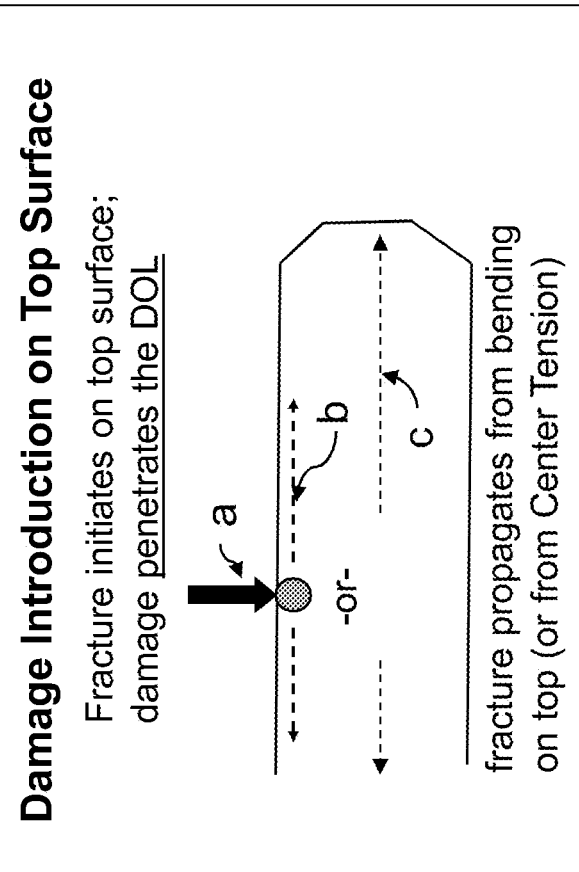
FIG. 3b is a schematic cross-sectional representation of the dominant mechanism for failure due to damage introduction plus bending that typically occurs in strengthened glass articles that are used in mobile or hand held electronic devices.

An IBoS test apparatus is schematically shown in FIG. 3a. Apparatus 200 includes a test stand 210 and a ball 230. Ball 230 is a rigid or solid ball such as, for example, a stainless steel ball, or the like. In one embodiment, ball 230 is a 4.2 gram stainless steel ball having diameter of 10 mm. The ball 230 is dropped directly onto the glass sample 218 from a predetermined height h. Test stand 210 includes a solid base 212 comprising a hard, rigid material such as granite or the like. A sheet 214 having an abrasive material disposed on a surface is placed on the upper surface of the solid base 212 such that surface with the abrasive material faces upward. In some embodiments, sheet 214 is sandpaper having a 30 grit surface and, in other embodiments, a 180 grit surface. Glass sample 218 is held in place above sheet 214 by sample holder 215 such that an air gap 216 exists between glass sample 218 and sheet 214. The air gap 216 between sheet 214 and glass sample 218 allows the glass sample 218 to bend upon impact by ball 230 and onto the abrasive surface of sheet 214. In one embodiment, the glass sample 218 is clamped across all corners to keep bending contained only to the point of ball impact and to ensure repeatability. In some embodiments, sample holder 214 and test stand 210 are adapted to accommodate sample thicknesses of up to about 2 mm. The air gap 216 is in a range from about 50 µm to about 100 µm. An adhesive tape 220 may be used to cover the upper surface of the glass sample to collect fragments in the event of fracture of the glass sample 218 upon impact of ball 230.

Various materials may be used as the abrasive surface. In a one particular embodiment, the abrasive surface is sandpaper, such as silicon carbide or alumina sandpaper, engineered sandpaper, or any abrasive material known in the art for having comparable hardness and/or sharpness. In some embodiments, sandpaper having 30 grit may be used, as it has a known range of particle sharpness, a surface topography more consistent than concrete or asphalt, and a particle size and sharpness that produces the desired level of specimen surface damage.

Figure 3C:
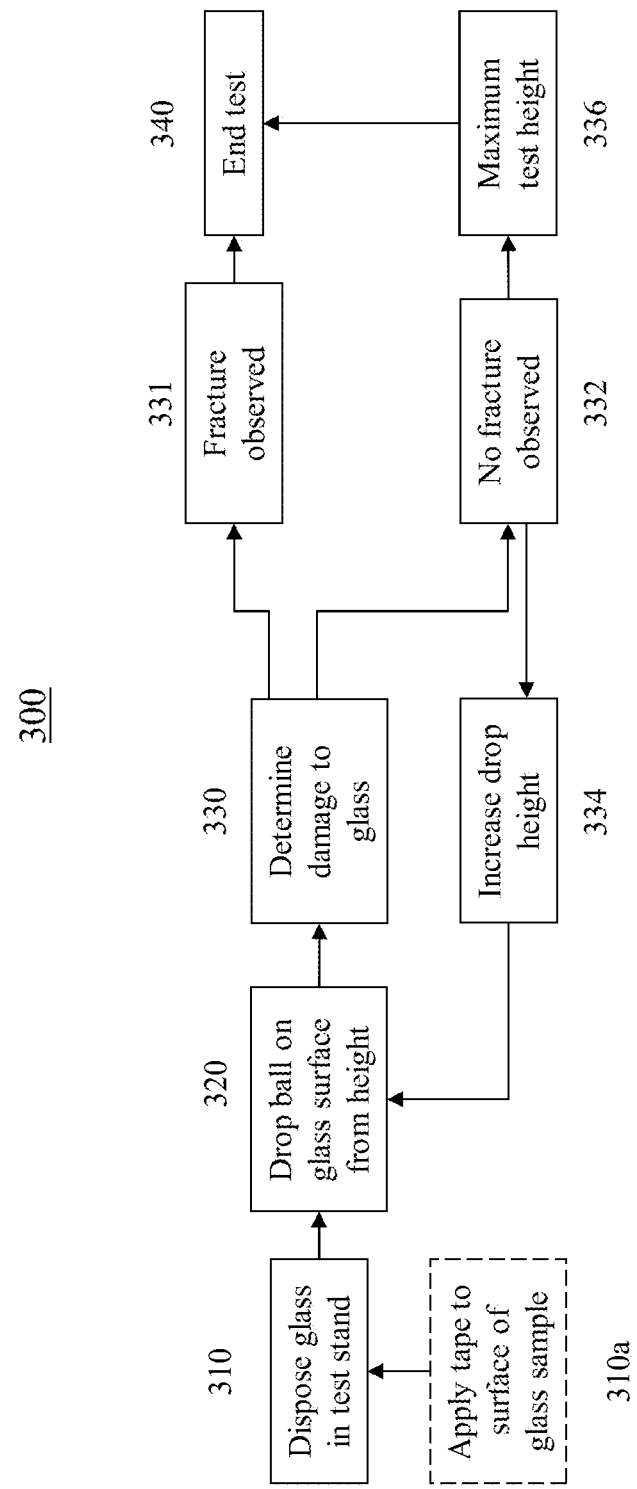
FIG. 3c is a flow chart for a method of conducting the IBoS test in the apparatus described herein.

In one aspect, a method 300 of conducting the IBoS test using the apparatus 200 described hereinabove is shown in FIG. 3c. In Step 310, a glass sample (218 in FIG. 3a) is placed in the test stand 210, described previously and secured in sample holder 215 such that an air gap 216 is formed between the glass sample 218 and sheet 214 with an abrasive surface. Method 300 presumes that the sheet 214 with an abrasive surface has already been placed in test stand 210. In some embodiments, however, the method may include placing sheet 214 in test stand 210 such that the surface with abrasive material faces upward. In some embodiments (Step 310a), an adhesive tape 220 is applied to the upper surface of the glass sample 218 prior to securing the glass sample 218 in the sample holder 210.

In Step 320, a solid ball 230 of predetermined mass and size is dropped from a predetermined height h onto the upper surface of the glass sample 218, such that the ball 230 impacts the upper surface (or adhesive tape 220 affixed to the upper surface) at approximately the center (i.e., within 1 mm, or within 3 mm, or within 5 mm, or within 10 mm of the center) of the upper surface. Following impact in Step 320, the extent of damage to the glass sample 218 is determined (Step 330). As previously described hereinabove, herein, the term "fracture" means that a crack propagates across the entire thickness and/or entire surface of a substrate when the substrate is dropped or impacted by an object.

In test method 300, the sheet 218 with the abrasive surface may be replaced after each drop to avoid "aging" effects that have been observed in repeated use of other types (e.g., concrete or asphalt) of drop test surfaces.

Various predetermined drop heights h and increments are typically used in test method 300. The test may, for example, utilize a minimum drop height to start (e.g., about 10-20 cm). The height may then be increased for successive drops by either a set increment or variable increments. The test method 300 is stopped once the glass sample 218 breaks or fractures (Step 331 in FIG. 3c). Alternatively, if the drop height h reaches the maximum drop height (e.g., about 220 cm) without glass fracture, the drop test method 300 may also be stopped, or the glass sample 218 may be repeatedly dropped from that maximum height until fracture occurs.

In some embodiments, IBoS test method 300 is performed only once on each glass sample 218 at each predetermined height h. In other embodiments, however, each sample may be subjected to multiple tests at each height.

If fracture of the glass sample 218 has occurred (Step 331 in FIG. 3c), the IBoS test method 300 is ended (Step 340). If no fracture resulting from the ball drop at the predetermined drop height is observed (Step 332), the drop height is increased by a predetermined increment (Step 334)—such as, for example 5, 10, or 20 cm—and Steps 320 and 330 are repeated until either sample fracture is observed (331) or the maximum test height is reached (336) without sample fracture. When either Step 331 or 336 is reached, the test method 300 is ended.

When the ball is dropped onto the surface of the glass from a height of 80 cm, the strengthened glasses described hereinabove have at least about a 50% survival rate when subjected to the inverted ball on sandpaper (IBoS) test described above. For example, a strengthened glass article is described as having a 50% survival rate when dropped from a given height when three of five identical (or nearly identical) samples (i.e., having approximately the same composition and, when strengthened, approximately the same CS and DOC or DOL) survive the IBoS drop test without fracture. In other embodiments, the survival rate of the strengthened glasses dropped from a height of 80 cm in the IBoS test is at least about 70%, in other embodiments, at least about 80%, and, in still other embodiments, at least about 90%. In other embodiments, the survival rate of the strengthened glasses dropped from a height of 100 cm in the IBoS test is at least about 60%, in other embodiments, at least about 70%, in still other embodiments, at least about 80%, and, in other embodiments, at least about 90%.

Figure 3D:
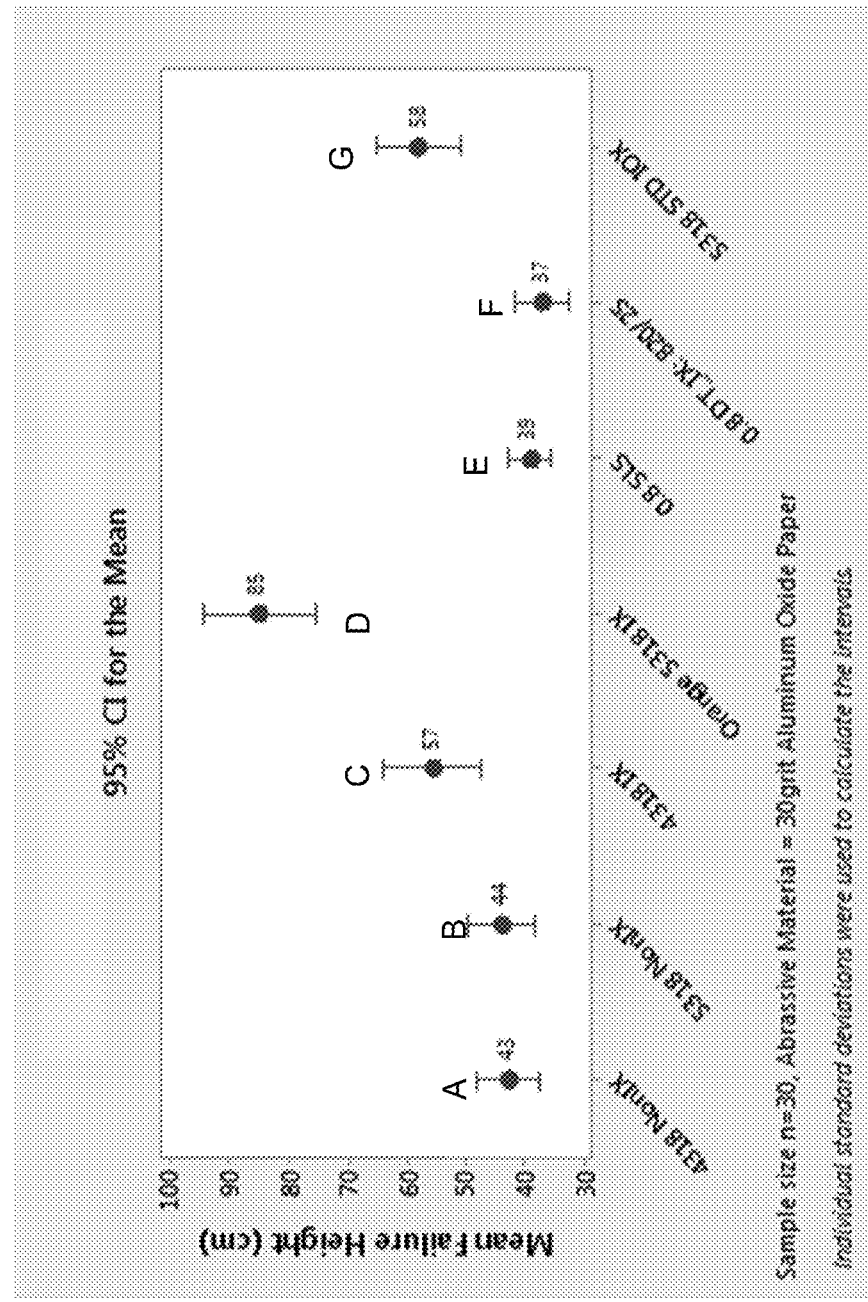
FIG. 3d a plot of inverted ball drop test results for various glasses.

FIG. 3d is a plot of IBoS test results, expressed in mean failure height, for groups of various glass samples. Each group of samples included 30 samples, each having a thickness of 0.8 mm. The abrasive material (214 in FIG. 3a) used in the tests was 30 grit alumina abrasive paper. The mean failure heights shown in FIG. 3d have a 95% confidence interval.

Groups A and C are groups of alkali aluminosilicate glass samples, each having a composition of 64.70 mol % $SiO_2$, 5.12 mol % $B_2O_3$, 13.94 mol % $Al_2O_3$, 13.73 mol % $Na_2O$, 2.42 mol % MgO, and 0.08 mol % $SnO_2$. The glass of Groups A and C is described in U.S. patent application Ser. No. 13/903,398 by Matthew J. Dejneka et al., entitled "Zircon Compatible, Ion Exchangeable Glass with High Damage Resistance," filed May 28, 2013, and claiming priority to U.S. Provisional Patent Application No. 61/653,485, filed May 31, 2012, the contents of which are incorporated by reference herein in their entirety. The samples in Group A were not ion exchanged, whereas the samples in Group C were ion exchanged in a single ion exchange bath comprising about 100% by weight, $KNO_3$ for 8 hours at 410° C.

Groups B, D, and G consist of alkali aluminosilicate glasses having a composition of 57.43 mol % $SiO_2$, 16.10 mol % $Al_2O_3$, 6.54 mol % $P_2O_5$, 17.05 mol % $Na_2O$, 2.81 mol % MgO, and 0.07 mol % $SnO_2$. The glass of groups B, D, and G are described in U.S. patent application Ser. No. 13/678,013 and U.S. Pat. No. 8,765,262, both cited previously hereinabove. The samples in Group B were not ion exchanged, and the samples in Group G were ion exchanged in a single ion exchange bath comprising 53% $NaNO_3$ and 47% $KNO_3$ by weight for 17.25 hours at 460° C. The samples in Group D were ion exchanged according to the dual ion exchange procedure described herein. The Group D samples were first ion exchanged in a molten salt bath comprising 53% $NaNO_3$ and 47% $KNO_3$ by weight for 17.25 hours at 460° C., followed by a second ion exchange in a bath comprising 0.5 wt % $NaNO_3$/99.5% $KNO_3$ by weight for 15 minutes at 390° C.

Group E consisted of soda lime glass coupons, each having a thickness of 0.8 mm. Group F consisted of DRAGONTRAIL™ glass manufactured by Asahi Glass Company having a composition of 65.89 mol % $SiO_2$, 7.93 mol % $Al_2O_3$, 11.72 mol % $Na_2O$, 4.02 mol % $K_2O$, 9.75 mol % MgO, 0.77 mol % ZrO, 0.01 mol % $TiO_2$, 0.02 mol % $Fe_2O_3$, and 0.07 mol % $Na_2SO_4$. Coupons of this glass were ion exchanged in a single 100 wt % $KNO_3$ ion exchange bath for 1.75 hours at 410° C.

The mean failure height for the different groups of glass samples are listed in Table 1. The alkali aluminosilicate samples of Group D, which were ion exchanged according to the dual ion exchange procedure described herein, had the highest mean failure height (85 cm). Groups C and G, which ion exchanged using a single step process, had mean failure heights of 57 cm and 58 cm, respectively. The remaining groups of samples had mean failure heights of 44 cm or less.

TABLE 1

Inverted ball drop test results for glass samples.

|  | A | B | C | D | E | F | G |
|---|---|---|---|---|---|---|---|
| Mean Drop height (cm) | 43 | 44 | 57 | 85 | 39 | 37 | 58 |

To determine the survivability rate of the strengthened glass article when dropped from a predetermined height using the IBoS test method and apparatus described hereinabove, at least five identical (or nearly identical) samples (i.e., having approximately the same composition and approximately the same CS and DOC or DOL) of the strengthened glass are tested, although larger numbers (e.g., 10, 20, 30, etc.) of samples may be subjected to testing to raise the confidence level of the test results. Each sample is dropped a single time from the predetermined height (e.g., 80 cm) and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

The strengthened glass articles described herein also demonstrate improved surface strength when subjected to abraded ring-on-ring (AROR) testing. In some embodiments, the glass articles described herein have a thickness ranging from about 0.755 mm to about 0.85 mm and exhibit a break load of at least about 27 kilogram force (kgf) when subjected to AROR testing. In other embodiments, these glasses have a thickness ranging from about 0.5 mm to about 0.6 mm and exhbiti a break load of at least about 12 kgf. The strength of a material is defined as the stress at which fracture occurs. The abraded ring-on-ring test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the ring-on-ring abraded ROR test methodology described herein. The contents of ASTM C1499-09 are incorporated herein by reference in their entirety. In one embodiment, the glass specimen is abraded prior to ring-on-ring testing with 90 grit silicon carbide (SiC) particles that are delivered to the glass sample using the method and apparatus described in Annex A2, entitled "abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass sample is abraded as described in ASTM C158-02, Annex 2, to normalize and/or control the surface defect condition of the sample using the apparatus shown in Figure A2.1 of ASTM C158-02. The abrasive material is sandblasted onto the sample surface at a load of 15 psi using an air pressure of 304 kPa (44 psi). After air flow is established, 5 $cm^3$ of abrasive material is dumped into a funnel and the sample is sandblasted for 5 seconds after introduction of the abrasive material.

Figure 4:
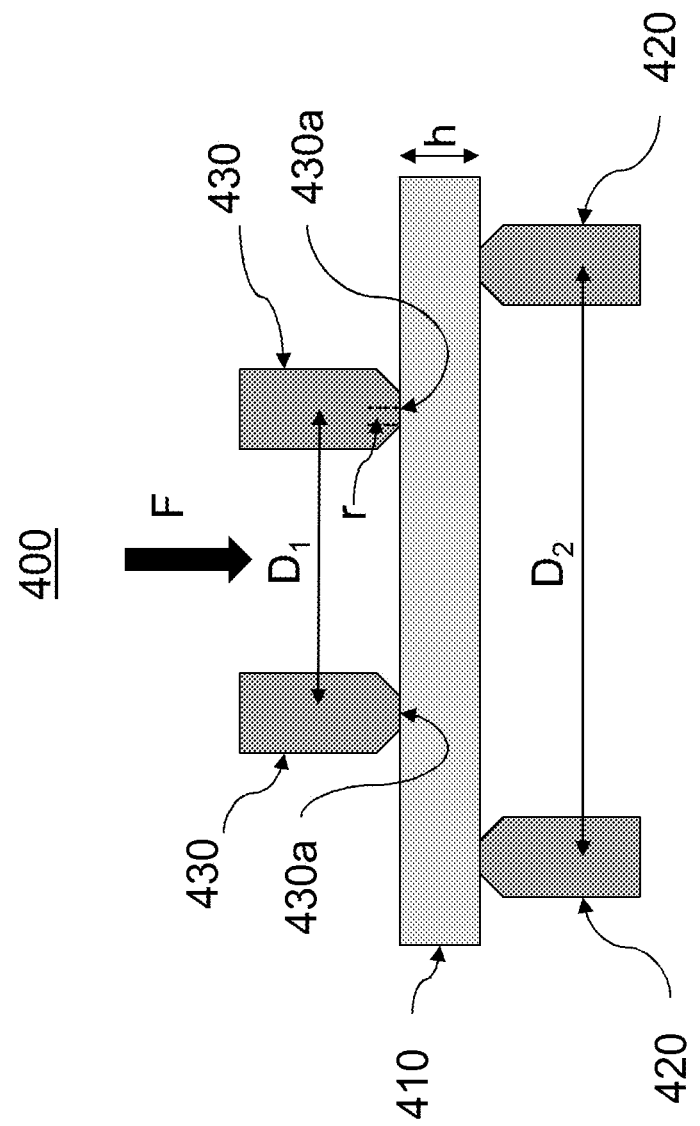
FIG. 4 is a schematic cross-sectional view of a ring-on-ring apparatus.

For the ring-on-ring test, a glass specimen having at least one abraded surface 412 is placed between two concentric rings of differing size to determine equibiaxial flexural strength (i.e., the maximum stress that a material is capable of sustaining when subjected to flexure between two concentric rings), as schematically shown in FIG. 4. In the abraded ring-on-ring configuration 400, the abraded glass specimen 410 is supported by a support ring 420 having a diameter $D_2$. A force F is applied by a load cell (not shown) to the surface of the glass specimen by a loading ring 430 having a diameter $D_1$.

The ratio of diameters of the loading ring and support ring $D_1/D_2$ may be in a range from about 0.2 to about 0.5. In some embodiments, $D_1/D_2$ is about 0.5. Loading and support rings 430, 420 should be aligned concentrically to within 0.5% of support ring diameter $D_2$. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, $h/2 \leq r \leq 3h/2$, where h is the thickness of specimen 410. Loading and support rings 430, 420 are typically made of hardened steel with hardness $HR_c > 40$. ROR fixtures are commercially available.

The intended failure mechanism for the ROR test is to observe fracture of the specimen 410 originating from the surface 430a within the loading ring 430. Failures that occur outside of this region—i.e., between the loading rings 430 and support rings 420—are omitted from data analysis. Due to the thinness and high strength of the glass specimen 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass depends on the presence of surface flaws. However, the likelihood of a flaw of a given size being present cannot be precisely predicted, as the strength of glass is statistical in nature. A Weibull probability distribution is therefore generally used as a statistical representation of the data obtained.

Figure 5:
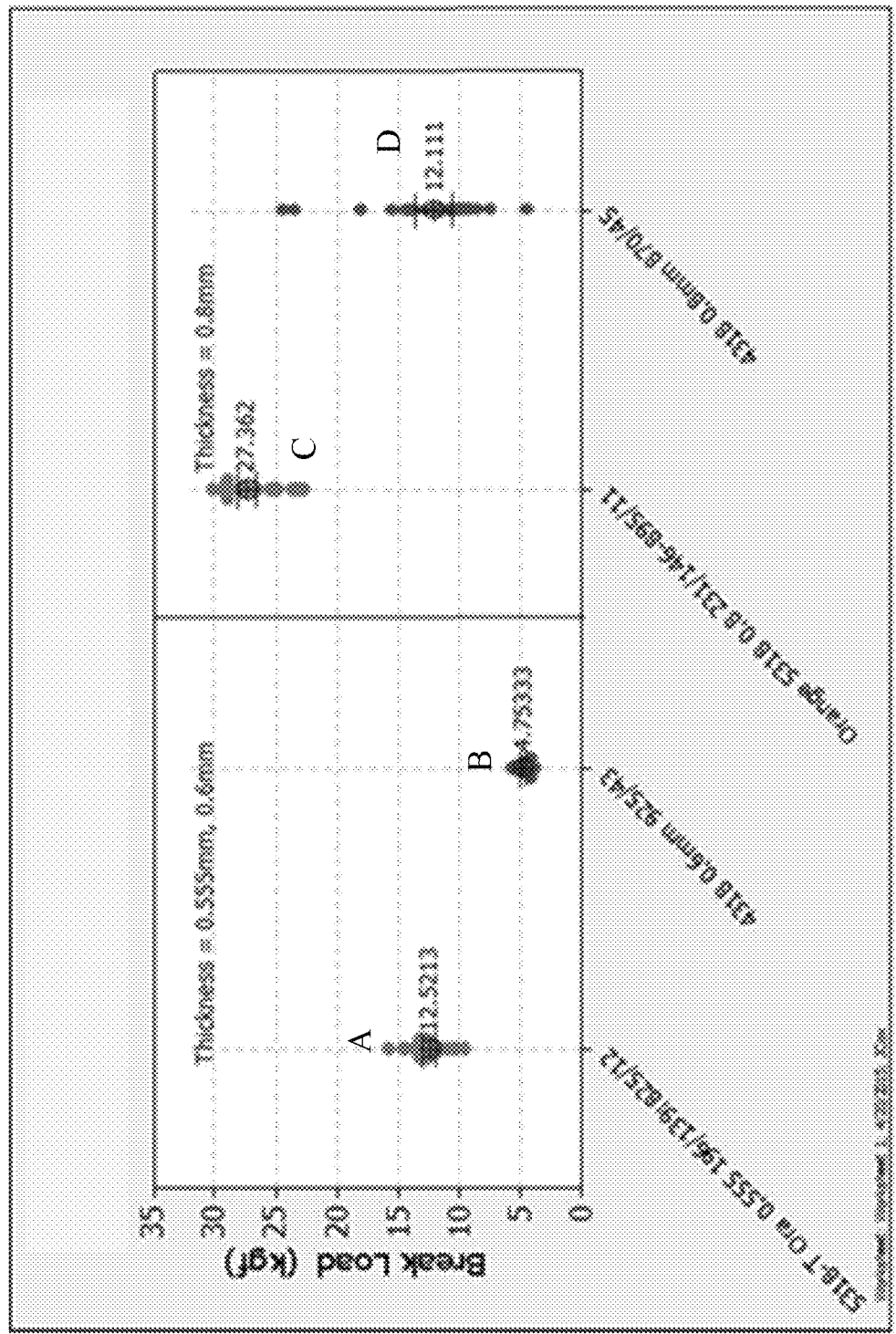
FIG. 5 is a plot of abraded ring-on-ring data as a function of sample thickness for two strengthened alkali aluminosilicate glasses.

Break loads determined by AROR testing for two strengthened alkali aluminosilicate glasses are plotted in FIG. 5. In each test, a surface of the material was abraded as described in ASTM C158-02, Annex 2, previously referenced hereinabove, using the apparatus shown in Figure A2.1 of ASTM C158-02 prior to ring-on-ring testing. The abrasive material (30 grit alumina powder) was sandblasted onto the sample surface at a load of 25 psi using an air pressure of 304 kPa (44 psi). Each sample group shown in FIG. 5 consisted of 30 individual glass coupons of identical composition, and the mean break load values listed having a 95% confidence level.

The samples in groups A and C were ion exchanged alkali aluminosilicate glasses having a composition of 57.43 mol % $SiO_2$, 16.10 mol % $Al_2O_3$, 6.54 mol % $P_2O_5$, 17.05 mol % $Na_2O$, 2.81 mol % MgO, and 0.07 mol % $SnO_2$. The glass of sample groups A and C are described in U.S. patent application Ser. No. 13/678,013 and U.S. Pat. No. 8,765,262, both cited previously hereinabove. Group A samples each had a thickness of 0.555 mm, whereas the samples in group C were 0.8 mm thick. Both sample groups were ion exchanged according to the two step ion exchange method previously described herein, so as to achieve a compressive stress "spike" in the region (b in FIG. 2, for example) extending from the surface of the glass to point D1 and a depth of layer DOL, as shown in FIG. 3). As such, these samples are presumed to have compressive stress profiles similar to that shown in FIG. 2.

The samples in groups B and D consisted of ion exchanged alkali aluminosilicate glass alkali aluminosilicate glass samples having a composition of 64.70 mol % $SiO_2$, 5.12 mol % $B_2O_3$, 13.94 mol % $Al_2O_3$, 13.73 mol % $Na_2O$, 2.42 mol % MgO, and 0.08 mol % $SnO_2$. The glass of sample groups A and C is described in U.S. patent application Ser. No. 13/903,398 by Matthew J. Dejneka et al., entitled "Zircon Compatible, Ion Exchangeable Glass with High Damage Resistance," filed May 28, 2013, and claiming priority to U.S. Provisional Patent Application No. 61/653,485, filed May 31, 2012, the contents of which are incorporated by reference herein in their entirety. Sample thicknesses for group B and group D were 0.6 mm and 0.8 mm, respectively. The samples of groups B and D were ion exchanged at 410° C. for eight hours in a molten salt bath comprising approximately 100% $KNO_3$ by weight. A second ion exchange was not performed on these samples.

The thicknesses, ion exchange conditions and resulting compressive stresses and depths of layer, and mean break loads as determined from abraded ring-on-ring results are listed for sample groups A-D in Table 2. As can be seen from the table, greater sample thickness produces greater break loads. In addition, sample groups A and B, which were subjected to the two-step ion exchange process described herein, exhibited significantly higher AROR break loads than glasses that were ion exchanged in a single step process (groups B and D) having approximately the same thickness.

TABLE 2

Summary of ion exchange conditions and resulting compressive stresses and depths of layer, and mean break loads as determined from abraded ring-on-ring results for alkali aluminosilicate samples.

| | Sample group | | | |
|---|---|---|---|---|
| | A | B | C | D |
| Thickness (mm) | 0.555 | 0.6 | 0.8 | 0.8 |
| First ion exchange | | | | |
| Temperature (° C.) | 460 | 410 | 460 | 410 |
| Time (hours) | 14 | 8 | 14 | 8 |
| Bath composition (wt %) | 49% $NaNO_3$ 51% $KNO_3$ | 100% $KNO_3$ | 49% $NaNO_3$ 51% $KNO_3$ | 100% $KNO_3$ |
| CS (MPa) | 196/ | 925/ | 231/ | 870/ |
| DOL (μm) | 139 | 43 | 146 | 45 |
| Second ion exchange | | | | |
| Temperature (° C.) | 390 | | 390 | |
| Time (minutes) | 15 | | 15 | |
| Bath composition (wt %) | 99.5% $KNO_3$ 0.5% $NaNO_3$ | | 99.5% $KNO_3$ 0.5% $NaNO_3$ | |
| CS (MPa) | 825 | | 895 | |
| D1 (μm) | 12 | | 11 | |
| AROR Mean Break Load (kgf) | 12.5213 | 4.7533 | 27.362 | 12.111 |

In some embodiments, the glass articles described herein form a portion of a consumer electronic product, such as those cellular or smart phones, laptop computers, tablets, or the like that are known in the art. Such consumer electronic products typically comprise a housing having a front surface, a back surface, and side surfaces; and include electrical components, which are at least partially internal to the housing and may include at least a power source, a controller, a memory, and a display. The display is, in some embodiments, provided at or adjacent the front surface of the housing. A cover glass comprising the strengthened glass article described herein, is provided at or over the front surface of the housing such that the cover glass is positioned over the display and protects the display from damage caused by impact or damage.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article comprising a compressive region extending from a surface of the glass article to a depth of layer DOL, the compressive region having a compressive stress profile, the compressive stress profile comprising:
   a. a first portion extending from at least a first depth D1 to the depth of layer DOL, wherein a compressive stress CS1 at a depth d in the first portion is given by the expression 200 MPa−d·1.54 MPa/μm<CS1≤260 MPa−d·1.49 MPa/μm, where d is expressed in microns (μm) and d>D1; and
   b. a second portion extending from the surface to the first depth D1, the second portion having a maximum compressive stress CS2 at the surface and being substantially linear and having an average slope $m_2$ from the surface to a depth of about 5 μm, wherein −74.00 MPa/μm≤$m_2$≤−70.00 MPa/μm.

2. The glass article of claim 1, wherein 185 MPa≤CS1≤240 MPa at D1.

3. The glass article of claim 1, wherein the glass article has a thickness t in a range from about 0.75 mm up to about 0.85 mm.

4. The article of claim 3, wherein the glass article exhibits an equibiaxial flexural strength of at least 27 kgf when subjected to abraded ring-on-ring testing.

5. The glass article of claim 1, wherein the glass article comprises an alkali aluminosilicate glass, the alkali aluminosilicate glass comprising at least about 4 mol % $P_2O_5$ and from 0 mol % to about 5 mol % $B_2O_3$, wherein $1.3<[(P_2O_5+R_2O)/M_2O_3]\leq 2.3$, where $M_2O_3=Al_2O_3+B_2O_3$, and $R_2O$ is the sum of monovalent cation oxides present in the alkali aluminosilicate glass.

6. The glass article of claim 4, wherein the alkali aluminosilicate glass comprises up to about 10 mol % $Li_2O$.

7. The glass article of claim 4, wherein the glass is lithium-free.

8. The glass article of claim 4, wherein the glass comprises from about 40 mol % to about 70 mol % $SiO_2$; from about 11 mol % to about 25 mol % $Al_2O_3$; from 0 mol % to about 5 mol % $B_2O_3$; from about 4 mol % to about 15 mol % $P_2O_5$; from about 13 mol % to about 25 mol % $Na_2O$; and from 0 mol % to about 1 mol % $K_2O$.

9. The glass article of claim 8, wherein 11 mol % $\leq M_2O_3 \leq 30$ mol %.

10. The glass article of claim 8, wherein $R_xO$ is the sum of alkali metal oxides, alkaline earth metal oxides, and transition metal monoxides present in the glass, and wherein 13 mol % $\leq R_xO < 30$ mol %.

11. The glass article of claim 8, wherein the alkali aluminosilicate glass comprises 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br.

12. The glass article of claim 1, wherein the first portion is linear at a depth d and wherein the compressive stress CS1, extrapolated from the depth d to zero depth below the surface, is in a range from about 200 MPa to about 260 MPa at zero depth.

13. The glass article of claim 1, wherein the glass article has at least a 50% survival rate when subjected to an inverted ball drop test with a 4.2 g stainless steel ball having a diameter of 10 mm from a height of about 80 cm onto a 30 grit sandpaper disposed on the surface of the glass, wherein the survival rate is based on testing at least 5 samples.

14. A consumer electronic device comprising:
a housing;
electrical components provided at least partially internal to the housing, the electrical components including at least a controller, a memory, and a display, the display being provided at or adjacent to a front surface of the housing; and
a cover glass provided at or over the front surface of the housing and over the display, wherein the cover glass comprises the glass article of claim 1.

15. A glass article comprising a compressive region extending from a surface of the glass article to a depth of compression DOC, a maximum compressive stress CS2 at the surface, and a compressive stress profile, the compressive stress profile comprising:

a. a first portion extending from at least a first depth D1 to the depth of compression DOC and having an average slope $m_1$, where $-2.89$ MPa/µm$\leq m_1 \leq -1.67$ MPa/µm; and
b. a second portion extending from the surface to the first depth D1, the second portion being substantially linear and having an average slope $m_2$ from the surface to a depth of about 5 µm, wherein $-74.00$ MPa/µm$\leq m_2 \leq -70.00$ MPa/µm.

16. The glass article of claim 15, wherein the glass article has a thickness t in a range from about 0.75 mm up to about 0.85 mm.

17. The glass article of claim 15, wherein the glass article comprises an alkali aluminosilicate glass, the alkali aluminosilicate glass comprising at least about 4 mol % $P_2O_5$ and from 0 mol % to about 5 mol % $B_2O_3$, wherein $1.3<[(P_2O_5+R_2O)/M_2O_3]<2.3$, where $M_2O_3=Al_2O_3+B_2O_3$, and $R_2O$ is the sum of monovalent cation oxides present in the alkali aluminosilicate glass.

18. The glass article of claim 17, wherein the alkali aluminosilicate glass comprises up to about 10 mol % $Li_2O$.

19. The glass article of claim 17, wherein the glass comprises from about 40 mol % to about 70 mol % $SiO_2$; from about 11 mol % to about 25 mol % $Al_2O_3$; from 0 mol % to about 5 mol % $B_2O_3$; from about 4 mol % to about 15 mol % $P_2O_5$; from about 13 mol % to about 25 mol % $Na_2O$; and from 0 mol % to about 1 mol % $K_2O$.

20. The glass article of claim 19, wherein 11 mol % $\leq M_2O_3 \leq 30$ mol %.

21. The glass article of claim 19, wherein $R_xO$ is the sum of alkali metal oxides, alkaline earth metal oxides, and transition metal monoxides present in the glass, and wherein 13 mol % $\leq R_xO \leq 30$ mol %.

22. The glass article of claim 19, wherein the alkali aluminosilicate glass comprises 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br.

23. The glass article of claim 15, wherein the glass is lithium-free.

24. The glass article of claim 15, wherein the first portion is linear at a depth d, and wherein the compressive stress CS1, extrapolated from the depth d to zero depth below the surface, is in a range from about 200 MPa to about 260 MPa at zero depth.

25. The glass article of claim 15, wherein the glass article has at least a 50% survival rate when subjected to an inverted ball drop test with a 4.2 g stainless steel ball having a diameter of 10 mm from a height of about 80 cm onto a 30 grit sandpaper disposed on the surface of the glass, wherein the survival rate is based on testing at least 5 samples.

26. A consumer electronic device comprising:
a housing;
electrical components provided at least partially internal to the housing, the electrical components including at least a controller, a memory, and a display, the display being provided at or adjacent to a front surface of the housing; and
a cover glass provided at or over the front surface of the housing and over the display, wherein the cover glass comprises the glass article of claim 15.

* * * * *

UNITED STATES PATENT AND TRADEMARK OFFICE
CERTIFICATE OF CORRECTION

PATENT NO. : 10,556,825 B2
APPLICATION NO. : 15/416205
DATED : February 11, 2020
INVENTOR(S) : Jaymin Amin et al.

It is certified that error appears in the above-identified patent and that said Letters Patent is hereby corrected as shown below:

On the Title Page

On Page 3, in Column 1, item (56), Other Publications, Line 18, delete "Opinoin" and insert -- Opinion --, therefor.

On Page 3, in Column 1, item (56), Other Publications, Line 19, delete "SU2015" and insert -- US2015 --, therefor.

On Page 3, in Column 2, item (56), Other Publications, Line 1, delete "Opinoin" and insert -- Opinion --, therefor.

On Page 3, in Column 2, item (56), Other Publications, Line 4, delete "Opinoin" and insert -- Opinion --, therefor.

On Page 3, in Column 2, item (56), Other Publications, Line 7, delete "Opinoin" and insert -- Opinion --, therefor.

On Page 3, in Column 2, item (56), Other Publications, Line 10, delete "Opinoin" and insert -- Opinion --, therefor.

On Page 3, in Column 2, item (56), Other Publications, Line 15, delete "PCTUS" and insert -- PCT/US --, therefor.

In the Claims

In Column 22, Line 57, Claim 1, delete "<CS1" and insert -- $\leq$CS1 --, therefor.

In Column 23, Line 2, Claim 3, delete "tin" and insert -- t in --, therefor.

In Column 23, Line 4, Claim 4, after "The" insert -- glass --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

In Column 23, Line 30, Claim 10, delete "<30" and insert -- ≤30 --, therefor.

In Column 24, Line 10 (approx.), Claim 16, delete "tin" and insert -- t in --, therefor.

In Column 24, Line 35 (approx.), Claim 22, delete "$Nb_2O_s$," and insert -- $Nb_2O_5$, --, therefor.